US012573179B2

(12) United States Patent
Yu et al.

(10) Patent No.: US 12,573,179 B2
(45) Date of Patent: Mar. 10, 2026

(54) ROCK IDENTIFICATION METHOD, SYSTEM AND APPARATUS, TERMINAL, AND READABLE STORAGE MEDIUM

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Xiaolu Yu, Beijing (CN); Yongqiang Zhao, Beijing (CN); Chunhua Ni, Beijing (CN); Zhongliang Ma, Beijing (CN); Shengyou Zhou, Beijing (CN); Weili Yang, Beijing (CN); Jun Zhang, Beijing (CN); Cheng Tao, Beijing (CN); Kuang Li, Beijing (CN); Qiang Wang, Beijing (CN); Lunju Zheng, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 128 days.

(21) Appl. No.: 18/264,654

(22) PCT Filed: Sep. 29, 2021

(86) PCT No.: PCT/CN2021/121840
§ 371 (c)(1),
(2) Date: Aug. 8, 2023

(87) PCT Pub. No.: WO2022/166232
PCT Pub. Date: Aug. 11, 2022

(65) Prior Publication Data
US 2024/0054766 A1    Feb. 15, 2024

(30) Foreign Application Priority Data

Feb. 8, 2021    (CN) ......................... 202110181773.4
Feb. 10, 2021    (CN) ......................... 202110182027.7

(51) Int. Cl.
*G06V 10/77* (2022.01)
*G06V 10/14* (2022.01)
(Continued)

(52) U.S. Cl.
CPC .......... *G06V 10/7715* (2022.01); *G06V 10/14* (2022.01); *G06V 10/26* (2022.01);
(Continued)

(58) Field of Classification Search
CPC .... G06V 10/7715; G06V 10/14; G06V 10/26; G06V 10/40; G06V 10/764; G06V 10/82;
(Continued)

(56) References Cited

U.S. PATENT DOCUMENTS

2015/0355158 A1* 12/2015 Lander ................... G01N 33/24
                                                                 702/2
2016/0343150 A1* 11/2016 Mezghani ................. G06T 7/73
(Continued)

FOREIGN PATENT DOCUMENTS

CN         1595203 A     3/2005
CN      203490417 U  *  3/2014
(Continued)

OTHER PUBLICATIONS

Muhammad et al. Mask R-CNN for rock-forming minerals identification on petrography, case study at Monterado, West Kalimantan, E3S Web of Conferences 200, 06007 (2020) (Year: 2020).*
(Continued)

*Primary Examiner* — Richard A Hansell, Jr.
(74) *Attorney, Agent, or Firm* — NKL Law; Allen Xue

(57) ABSTRACT
A method for rock identification includes the steps of receiving a rock slice image transmitted by an image acqui-
(Continued)

sition device, generating a geometric feature, a mineral feature and a structural feature corresponding to a rock slice based on the rock slice image, and generating an identification result of the rock slice based on the geometric feature, the mineral feature and the structural feature. After the rock slice image is obtained, the rock slice image is subject to feature extraction based on three dimensions, i.e., the geometric feature, the mineral feature and the structural feature, the properties of rock are determined based on multiple dimensional features, and finally the identification result comprising a textual description is generated. After a microscopic visual image corresponding to the rock slice is obtained, feature extraction based on multiple dimensions is performed on the image, and the rock slice is identified with reference to multi-dimensional features.

14 Claims, 22 Drawing Sheets

(51) Int. Cl.

| | | |
|---|---|---|
| *G06V 10/26* | (2022.01) | |
| *G06V 10/40* | (2022.01) | |
| *G06V 10/764* | (2022.01) | |
| *G06V 10/82* | (2022.01) | |
| *G06V 20/60* | (2022.01) | |

(52) U.S. Cl.
CPC ............ *G06V 10/40* (2022.01); *G06V 10/764* (2022.01); *G06V 10/82* (2022.01); *G06V 20/60* (2022.01)

(58) Field of Classification Search
CPC .......... G06V 20/60; G06T 2207/10056; G06T 2207/20081; G06T 2207/20084; G06T 7/0004; G06T 7/90; G06T 2207/10024; G06T 2207/20032; G06T 5/70; G06N 3/09; G06N 3/045; G06N 3/08; G06F 18/2415
See application file for complete search history.

(56) References Cited

U.S. PATENT DOCUMENTS

| | | | |
|---|---|---|---|
| 2019/0318467 A1 | 10/2019 | Anifowose et al. | |
| 2020/0005013 A1* | 1/2020 | Zhao .................... | G06V 20/695 |
| 2021/0215590 A1* | 7/2021 | Li .......................... | G01N 33/24 |
| 2022/0207079 A1* | 6/2022 | Shebl ..................... | G06V 20/69 |

FOREIGN PATENT DOCUMENTS

| | | | | | |
|---|---|---|---|---|---|
| CN | 104112126 A | | 10/2014 | | |
| CN | 104134069 A | | 11/2014 | | |
| CN | 105354600 A | | 2/2016 | | |
| CN | 106485223 A | | 3/2017 | | |
| CN | 106677708 A | | 5/2017 | | |
| CN | 107633255 A | * | 1/2018 | | |
| CN | 108318515 A | | 7/2018 | | |
| CN | 109283148 A | | 1/2019 | | |
| CN | 109523566 A | | 3/2019 | | |
| CN | 109800728 A | | 5/2019 | | |
| CN | 110286141 A | | 9/2019 | | |
| CN | 110443303 A | | 11/2019 | | |
| CN | 110873722 A | | 3/2020 | | |
| CN | 111007064 A | | 4/2020 | | |
| CN | 111160158 A | | 5/2020 | | |
| CN | 111382676 A | | 7/2020 | | |
| CN | 111563445 A | | 8/2020 | | |
| JP | 2015040724 A | | 3/2015 | | |
| JP | 2017506367 A | | 3/2017 | | |
| JP | 2020519901 A | | 7/2020 | | |
| WO | WO-2012137212 A2 | * | 10/2012 | .......... | G02B 21/086 |
| WO | 2020225592 A1 | | 11/2020 | | |

OTHER PUBLICATIONS

Wang, Yuzhu et al. "Image-based rock typing using grain geometry features"; Computers and Geosciences; Jan. 22, 2021; vol. 149; 104703; pp. 1-11.

Tang, David G. et al. "Machine learning for 1-15 point counting and segmentation of arenite in thin section"; Marine and Petroleum Geology; Jun. 11, 2020; vol. 120; 104518; pp. 1-17.

Iyas, Muhammad Ridwan et al. "Mask R-CNN for rock-forming minerals identification on petrography, case study at Monterado, West Kalimantan"; E3S Web Conf.; Oct. 23, 2020; vol. 200; pp. 1-6.

* cited by examiner

| Receiving a rock slice image | — 301 |

Generating the geometric feature, the mineral feature and the structural feature corresponding to the rock slice based on the rock slice image — 302

Generating an identification result of the rock slice based on the geometric feature, the mineral feature and the structural feature — 303

401

400

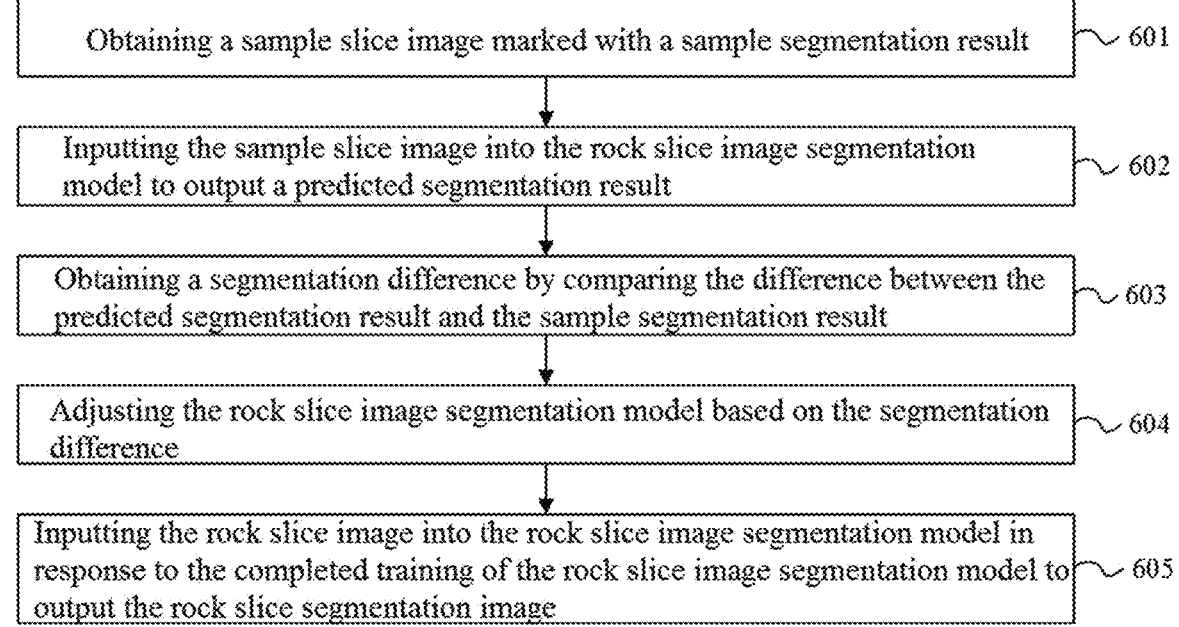

Obtaining a sample slice image marked with a sample segmentation result ~ 601

Inputting the sample slice image into the rock slice image segmentation model to output a predicted segmentation result ~ 602

Obtaining a segmentation difference by comparing the difference between the predicted segmentation result and the sample segmentation result ~ 603

Adjusting the rock slice image segmentation model based on the segmentation difference ~ 604

Inputting the rock slice image into the rock slice image segmentation model in response to the completed training of the rock slice image segmentation model to output the rock slice segmentation image ~ 605

Determining the component images based on the segmentation regions, each component image comprising one component region ~ 901

Obtaining a sample component image marked with a sample component type feature ~ 902

Inputting the sample component image into the component type identification model to output a predicted component type feature ~ 903

Comparing the predicted component type feature with the sample component type feature to obtain an identification difference ~ 904

Adjusting the component type identification model based on the identification difference ~ 905

Inputting the component image into the component type identification model in response to the completed training of the component type identification model to output the component type feature of the component image ~ 906

Determining the mineral feature corresponding to the rock slice based on the component type feature corresponding to the component images ~ 907

FIG. 9

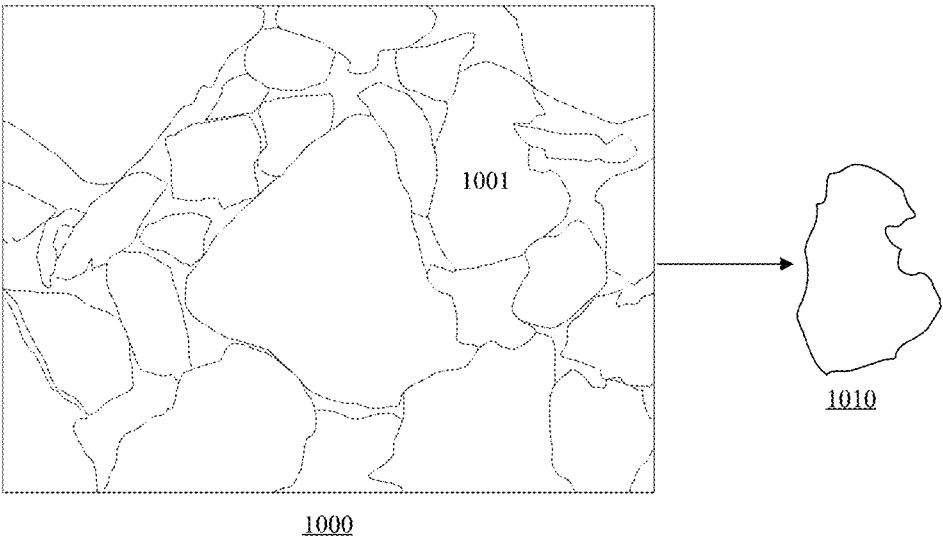

FIG 10

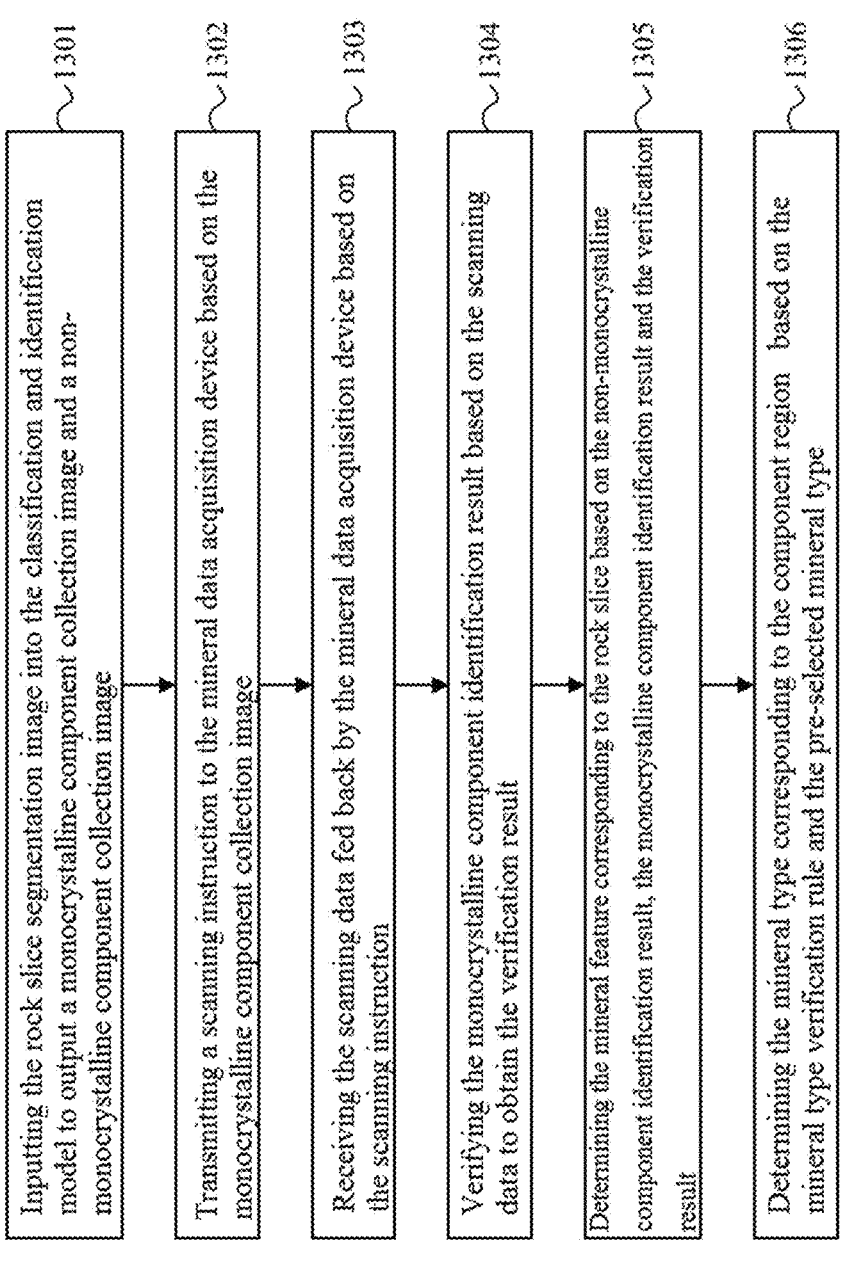

Inputting the rock slice segmentation image into the classification and identification model to output a monocrystalline component collection image and a non-monocrystalline component collection image ⌇1301

Transmitting a scanning instruction to the mineral data acquisition device based on the monocrystalline component collection image ⌇1302

Receiving the scanning data fed back by the mineral data acquisition device based on the scanning instruction ⌇1303

Verifying the monocrystalline component identification result based on the scanning data to obtain the verification result ⌇1304

Determining the mineral feature corresponding to the rock slice based on the non-monocrystalline component identification result, the monocrystalline component identification result and the verification result ⌇1305

Determining the mineral type corresponding to the component region based on the mineral type verification rule and the pre-selected mineral type ⌇1306

Quartz detritus region 1401

Siliceous-calcareous cement region 1402

Non-terrigenous detritus region 1403

Rock debris and detritus region 1404

Matrix filler region 1405

Argillaceous cement region 1406

1500

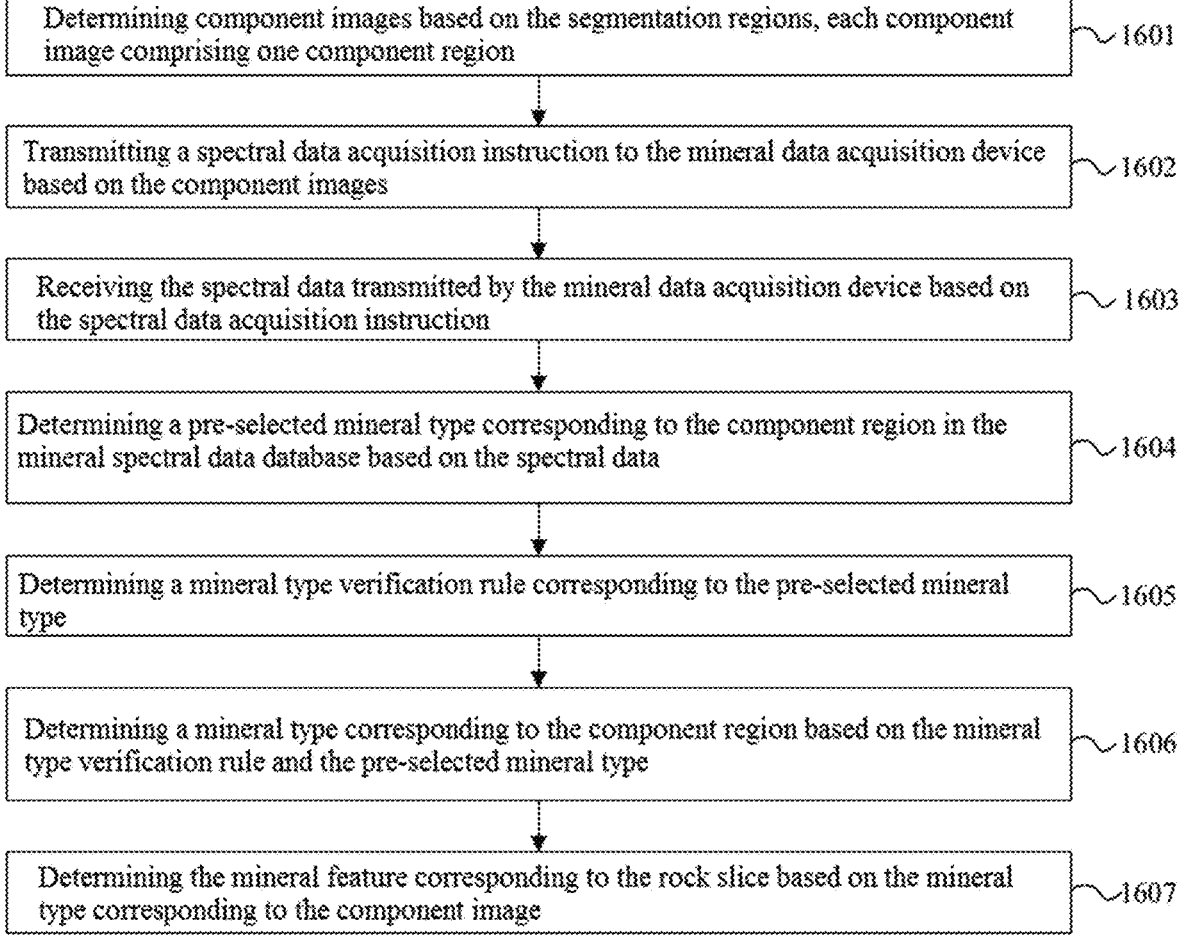

Determining component images based on the segmentation regions, each component image comprising one component region ~ 1601

Transmitting a spectral data acquisition instruction to the mineral data acquisition device based on the component images ~ 1602

Receiving the spectral data transmitted by the mineral data acquisition device based on the spectral data acquisition instruction ~ 1603

Determining a pre-selected mineral type corresponding to the component region in the mineral spectral data database based on the spectral data ~ 1604

Determining a mineral type verification rule corresponding to the pre-selected mineral type ~ 1605

Determining a mineral type corresponding to the component region based on the mineral type verification rule and the pre-selected mineral type ~ 1606

Determining the mineral feature corresponding to the rock slice based on the mineral type corresponding to the component image ~ 1607

FIG. 16

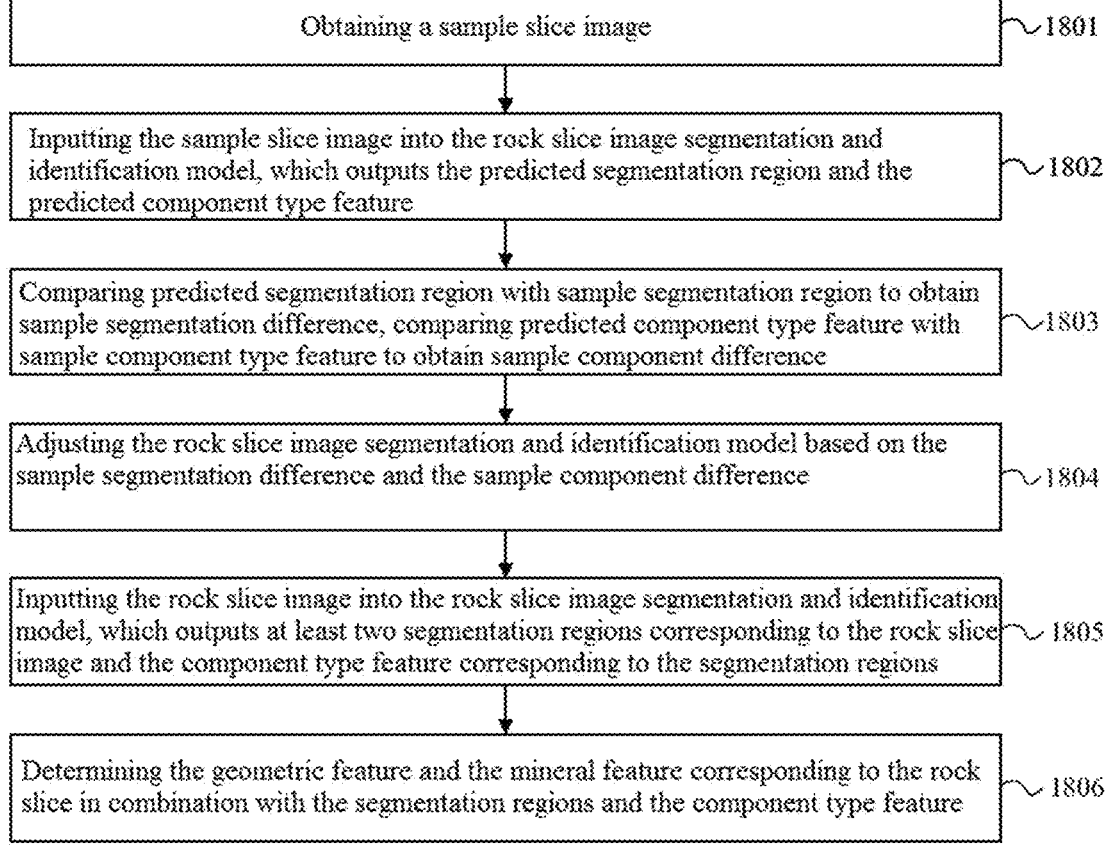

| Obtaining a sample slice image | 1801 |

| Inputting the sample slice image into the rock slice image segmentation and identification model, which outputs the predicted segmentation region and the predicted component type feature | 1802 |

| Comparing predicted segmentation region with sample segmentation region to obtain sample segmentation difference, comparing predicted component type feature with sample component type feature to obtain sample component difference | 1803 |

| Adjusting the rock slice image segmentation and identification model based on the sample segmentation difference and the sample component difference | 1804 |

| Inputting the rock slice image into the rock slice image segmentation and identification model, which outputs at least two segmentation regions corresponding to the rock slice image and the component type feature corresponding to the segmentation regions | 1805 |

| Determining the geometric feature and the mineral feature corresponding to the rock slice in combination with the segmentation regions and the component type feature | 1806 |

FIG. 18

| Slice sample information region 2120 | | | Component feature region 2130 | | | | | | | | Structural feature region 2140 | | | |
|---|---|---|---|---|---|---|---|---|---|---|---|---|---|---|
| Sample No. | Depth m | Horizon | Terrigenous detritus % | | | Non-terrigenous detritus % | Filler % | | | | Main particle size interval mm | Maximum particle size mm | Sorting | Roundness | Contact mode |
| | | | Quartz | Feldspar | Rock debris | Total detritus % | Matrix | Cement | | Total filler % | | | | | |
| | | | | | | | | Siliceous | Calcareous | Argillaceous | | | | | |

Clastic rock designation region 2110

Rock slice image display region 2150

ROCK IDENTIFICATION METHOD, SYSTEM AND APPARATUS, TERMINAL, AND READABLE STORAGE MEDIUM

CROSS-REFERENCE OF RELATED APPLICATIONS

This application is a U.S. national stage entry of PCT International Application No. PCT/CN2021/121840, filed on Sep. 29, 2021, which claims the priorities of Chinese patent application CN 202110181773.4, entitled "Rock slice intelligent identification device and method" and filed on Feb. 8, 2021, and of Chinese patent application CN 202110182027.7, entitled "A method for identifying organisms in carbonate rock slice" and filed on Feb. 10, 2021, the content of each is incorporated herein by reference in its entirety.

TECHNICAL FIELD

The present application relates to the field of rock identification technology, and specifically to a rock identification method and device, a terminal and a readable storage medium.

TECHNICAL BACKGROUND

It is one of the most fundamental, convenient, and economical methods in geological research and production to cut and grind rocks into 30-micron-thick slices according to optical principles, for observation and study with a polarizing microscope, which is also the basic knowledge and skill that geologists must master.

In the traditional method of rock slice identification that is still used today, the researcher usually performs manual identification on rock slice through microscopic observation. In the meantime, the researcher also captures microscopic images by using suitable devices and computers for observation in more detail.

However, both the techniques of direct observation of rock slices and input of rock slice images into a computer for observation are affected by subjective elements to a large degree, so that errors are inevitable, resulting in low accuracy of rock identification.

SUMMARY OF THE INVENTION

The present application relates to a rock identification method, system and device, a terminal and a readable storage medium, whereby the accuracy of rock identification can be improved. The technical solutions are illustrated as follows.

In one aspect, a rock identification method is provided, which is applied to a computer device of a rock identification system. The system comprises an image capturing device and a computer device. The image capturing device is connected to the computer device. The method comprises:

receiving a rock slice image transmitted by the image capturing device, wherein the rock slice image is an image obtained by photographing a rock slice, the rock slice is a slice obtained by cutting a rock sample, and the rock slice image includes at least one component region;

generating a geometric feature, a mineral feature and a structural feature corresponding to the rock slice based on the rock slice image, wherein the geometric feature is used to indicate division of the component region of the rock slice, the mineral feature is used to indicate distribution of mineral type corresponding to the component region in the rock slice and a mineral identification result obtained therefrom, and the structural feature is used to indicate rock type of the rock sample; and generating an identification result of the rock slice based on the geometric feature, the mineral feature and the structural feature.

In one optional embodiment, the method further comprises:

obtaining a sample slice image marked with a sample segmentation result;

inputting the sample slice image into a rock slice image segmentation model to output a predicted segmentation result;

comparing the predicted segmentation result with the sample segmentation result to obtain a segmentation difference; and adjusting the rock slice image segmentation model based on the segmentation difference.

In one optional embodiment, after comparing the predicted segmentation result with the sample segmentation result for the difference, the method further comprises:

determining, in response to the segmentation difference indicating a difference threshold between the predicted segmentation result and the sample segmentation result, that the training of the rock slice image segmentation model is completed; or determining, in response to a number of sample slice image inputs into the rock slice image segmentation model in a segmentation training cycle reaching a segmentation count threshold, that the training of the rock slice image segmentation model is completed.

In one optional embodiment, the method further comprises:

obtaining a sample component image marked with a sample component type feature;

inputting the sample component image into a component type identification model to output a predicted component type feature;

comparing the predicted component type feature with the sample component type feature to obtain an identification difference; and adjusting the component type identification model based on the identification difference.

In one optional embodiment, a non-monocrystalline component collection image includes an amorphous component collection image and a polycrystalline component collection image. A non-monocrystalline component region includes an amorphous component region and a polycrystalline component region, the amorphous component region corresponding to an amorphous component identification result, and the polycrystalline component region corresponding to a polycrystalline component identification result.

In one optional embodiment, the rock slice is a clastic rock slice;

a monocrystalline component region includes a quartz-feldspar detritus region and a siliceous-calcareous cement region, and a non-monocrystalline component region includes a non-terrigenous detritus region, a debris and detritus region, a matrix filler region, and an argillaceous cement region;

a classification and identification model includes a classification sub-model group and an identification sub-model group;

the classification sub-model group includes a particle classification sub-model, a detritus classification sub-model, a terrigenous detritus classification sub-model, a filler classification sub-model, and a cement classification sub-model; and the identification sub-model group includes a non-terrigenous detritus identification sub-model, a debris and detritus identification sub-model, a quartz-feldspar detritus identification sub-model, a siliceous-calcareous cement identification sub-model, an argillaceous cement identification sub-model, and a matrix filler identification sub-model;

The rock slice segmentation image is input into the classification and identification model to output the monocrystalline component collection image and the non-monocrystalline component collection image;

the clastic rock slice is input into the particle classification sub-model to output a detritus sub-image and a filler sub-image;

the detritus sub-image is input into the detritus classification sub-model to output the non-terrigenous detritus sub-image and the terrigenous detritus sub-image;

the terrigenous detritus sub-image is input into a terrigenous detritus classification sub-model to output the rock debris and detritus sub-image and the quartz-feldspar detritus sub-image;

the filler sub-image is input into the filler classification sub-model to output the matrix filler sub-image and the cement sub-image;

the cement sub-image is input into the cement classification sub-model to output the siliceous-calcareous cement sub-image and the argillaceous cement sub-image;

the non-terrigenous detritus sub-image is input into the non-terrigenous detritus identification sub-model to output the non-terrigenous detritus identification result, and the non-terrigenous detritus region is determined based on the non-terrigenous detritus identification result;

the rock debris sub-image is input into the rock debris and detritus identification sub-model to output the rock debris and detritus identification result, and the rock debris region is determined based on the rock debris and detritus identification result;

the quartz-feldspar sub-image is input into the quartz-feldspar detritus identification sub-model to output the quartz-feldspar detritus identification result, and the quartz-feldspar detritus region is determined based on the quartz-feldspar detritus identification result;

the matrix filler sub-image is input into the matrix filler identification sub-model to output the matrix filler identification result, and the matrix filler region is determined based on the matrix filler identification result;

the siliceous-calcareous cement sub-image is input into the siliceous-calcareous cement identification sub-model to output the siliceous-calcareous cement identification result, and the siliceous-calcareous cement region is determined based on the siliceous-calcareous cement identification result;

the argillaceous cement sub-image is input into the argillaceous cement identification sub-model to output the argillaceous cement identification result, and the argillaceous cement region is determined based on the argillaceous cement identification result;

the monocrystalline component region is determined based on the quartz-feldspar detritus region and the siliceous-calcareous cement region; and the non-monocrystalline component region is determined based on the non-terrigenous detritus region, the rock debris and detritus region, the argillaceous cement region and the matrix filler region.

In one optional embodiment, the method comprises:

obtaining the sample slice image marked with the sample segmentation regions and the sample component type feature;

inputting the sample slice image into the rock slice image identification model to output the predicted segmentation regions and the predicted component type feature;

comparing the predicted segmentation regions with the sample segmentation regions to obtain a sample segmentation difference, and comparing the predicted component type feature with the sample component type feature to obtain a sample component difference; and adjusting the rock slice image identification model based on the sample segmentation difference and the sample component difference.

In one optional embodiment, the rock slice identification result includes a maximum particle size identification result;

a rock slice structure identification result is generated based on the geometric feature and the mineral feature, including:

determining, based on the mineral feature, a maximum particle component region corresponding to the maximum particle size identification result; and determining, based on the geometric feature, a maximum particle size corresponding to the component region, and generating the maximum particle size identification result based on the maximum particle size.

In one optional embodiment, the rock slice identification result includes a particle sortability result;

the rock slice structure identification result is generated based on the geometric feature and the mineral feature, including:

determining, based on the mineral feature, a set of sortability component regions corresponding to the particle sortability identification result, the set of sortability component regions including at least two component regions;

determining a particle size level correspondence based on the geometric feature corresponding to the component regions in the set of sortability component regions, the particle size level correspondence including at least two levels of particle size, and a number of component regions in the particle size level; and the particle sortability result is determined based on the particle size level correspondence.

In one optional embodiment, the rock slice identification result includes a particle roundness identification result;

the rock slice structure identification result is generated based on the geometric feature and the mineral feature, comprising:

determining, based on the mineral feature, a set of roundness identification component regions corresponding to the particle roundness identification result, the set of roundness identification component regions including at least two component regions;

determining, based on the geometric feature corresponding to the component regions in the set of roundness component identification regions, a roundness level correspondence including at least two roundness levels, and a number of component regions in the roundness levels; and the particle roundness identification result is determined based on the roundness level correspondence.

In one optional embodiment, the rock slice identification result includes a particle automorphic degree result;

the rock slice structure identification result is generated based on the geometric feature and the mineral feature, comprising:

determining, based on the mineral feature, a set of automorphic degree component regions corresponding to the particle automorphic degree result, the set of automorphic degree component regions including at least two automorphic degree component regions;

determining shapes of the component regions based on the geometric feature corresponding to the component regions in the set of automorphic degree component regions; and determining the particle automorphic degree result based on the shapes of the component regions.

In one optional embodiment, the rock slice identification result includes a particle contact mode identification result;

the rock slice structure identification result is generated based on the geometric feature and the mineral feature, comprising:

determining at least two sets of component region pairs based on the mineral feature, the component region pair including two adjacent component regions;

determining, based on the geometric feature, an intersection over union of two component regions in the component region pairs; and determining the particle contact mode identification result based on the intersection over union of the at least two component regions.

In one optional embodiment, a rock slice name is determined based on the rock slice identification result, comprising:

determining a naming rule corresponding to the rock slice name based on the subdivided rock type feature; and generating the rock slice name based on the naming rule and the rock slice structure identification result.

A rock identification system is further provided, which comprises an image acquisition device and a computer device connected to each other, wherein the image acquisition device is configured to generate a rock slice image and transmit the rock slice image to the computer device; and the computer device is configured to receive the rock slice image transmitted by the image acquisition device and obtained by photographing a rock slice, the rock slice is a slice obtained by cutting a rock sample, the rock slice image includes at least one component region, a geometric feature, a mineral feature and a structural feature are generated corresponding to the rock slice based on the rock slice image, the geometric feature is used to indicate division of the component region of the rock slice, the mineral feature is used to indicate distribution of mineral type corresponding to the component region in the rock slice and a mineral identification result obtained, the structural feature is used to indicate rock type of the rock sample, and the rock slice identification result is generated based on the geometric feature, the mineral feature and the structural feature.

A rock identification device is further provided, which comprises:

a receiving module for receiving a rock slice image transmitted by an image acquisition device and obtained by photographing a rock slice, which is a slice obtained by cutting a rock sample, the rock slice image including at least one component region; and a generating module for generating a geometric feature, a mineral feature and a structural feature corresponding to the rock slice based on the rock slice image, wherein the geometric feature is used to indicate division of component regions of the rock slice, the mineral feature is used to indicate distribution of mineral types corresponding to the component regions in the rock slice and a mineral identification result obtained, and the structural feature is used to indicate rock types of the rock sample, wherein the generating module is further configured to generate an identification result of the rock slice based on the geometric feature, the mineral feature and the structural feature.

A computer device is further provided, which comprises a processor and a memory, the memory storing at least one instruction, at least one segment of program, at least one code set or at least one instruction set, wherein the at least one instruction, at least one segment of program, at least one code set or at least one instruction set is loaded and executed by the processor to implement the rock identification method provided in the embodiments of the present application.

A computer-readable storage medium is further provided, which stores at least one instruction, at least one segment of program, at least one code set or at least one instruction set, wherein the at least one instruction, at least one segment of program, at least one code set or at least one instruction set is loaded and executed by a processor to implement the rock identification method provided in the embodiments of the present application.

A computer program product or a computer program is further provided, which comprises a computer program instruction stored in the computer-readable storage medium. The processor can read the computer instruction from the computer-readable storage medium, and execute the computer instruction, so that the computer device can perform the rock identification method provided in the embodiments of the present application.

The beneficial effects of the technical solutions provided by the present application are at least as follows.

After a rock slice image is obtained, feature extraction for the rock slice image is performed based on features in three dimensions, i.e., the geometric feature, the mineral feature and the structural feature. The properties of the rock are determined from the perspectives of microscopic composition and macroscopic performance in combination with features of multiple dimensions, and ultimately an identification result including a textual description is generated. In the procedure of rock identification, after a corresponding microscopic visualized image of the rock slice is obtained, extraction of multi-dimensional features is performed on the image. The rock slice then is identified with reference to said multi-dimensional features, which improves the accuracy of rock identification.

BRIEF DESCRIPTION OF THE DRAWINGS

In order to illustrate the technical solutions in the embodiments of the present invention more clearly, the drawings necessary to introduce the embodiments are described briefly below. It would be apparent that the drawings introduced below relate to some embodiments of the present invention only, and one skilled in the art may conceive other drawings on the basis of these drawings without creative labor.

FIG. 6 is a flow chart showing a method for segmenting the rock slice image provided by an exemplary embodiment of the present application.

FIG. 9 is a flow chart showing a method of identifying the mineral feature provided by an exemplary embodiment of the present application.

FIG. 10 schematically shows a method of extracting segmentation regions in the rock slice segmentation image provided by an exemplary embodiment of the present application.

FIG. 13 is a flow chart schematically showing an identification method for determining the mineral feature corresponding to a rock slice provided by an exemplary embodiment of the present application.

FIG. 16 is a flow chart showing a method of determining the mineral feature corresponding to component regions provided by an exemplary embodiment of the present application.

FIG. 18 schematically shows a procedure for determining the geometric feature and the mineral feature provided by an exemplary embodiment of the present application.

FIG. 21 schematically shows a rock slice identification report provided by an exemplary embodiment of the present application.

FIG. 2.3 schematically shows a magma rock slice provided by an exemplary embodiment of the present application.

DETAILED DESCRIPTION OF EMBODIMENTS

Figure 1:
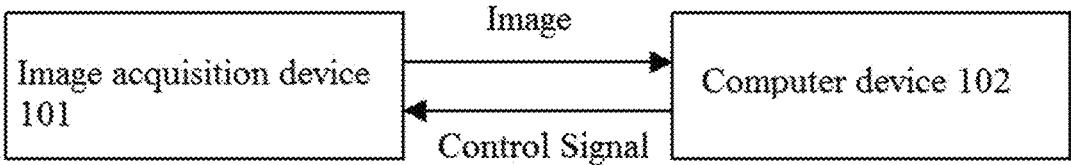
FIG. 1 schematically shows a rock identification system provided by an exemplary embodiment of the present application.

In order to illustrate the purpose, the technical solutions and the advantages of the present application more clearly, the embodiments of the present application will be explained in further detail with reference to the accompanying drawings.

First, the terms involved in the embodiments of the present application are explained.

"Component" refers to component of a mixture. In the present application, a component refers to a component of a solid material. Since the solid material is a mixture that includes at least two components separate from each other, it is also referred to as a solid multi-component mixed material. In one embodiment, where the mixture is embodied as metal wire, the components of the wire include at least one of lead, cadmium, bismuth, and tin. In another embodiment, where the mixture is embodied as rock, the components of the rock include, but are not limited to, at least one of terrigenous detritus, non-terrigenous detritus, cement, and matrix components. In the present application, component indicates the components contained in the rock slice, the image of which includes different component regions corresponding to different components.

"Image processing technology" is a technology of processing image information by computer. Image processing technology mainly includes image digitization, image enhancement and restoration, image data encoding, image segmentation and image recognition. Among others, image segmentation is a technique and procedure of segmenting an image into several specific regions with unique properties and presenting the target of interest. Methods of image segmentation include at least one of threshold-based segmentation method, region-based segmentation method, edge-based segmentation method, and segmentation method based on a specific theory. Image recognition refers to a technique that uses computers to process, analyze and understand images in order to recognize various targets and objects of different patterns, which is a practical application of deep learning algorithms. At the present stage, image recognition technology generally includes face recognition and commodity recognition. Face recognition is mainly applied in security inspection, identity verification and mobile payment, and commodity recognition is mainly applied in the procedure of commodity circulation, especially in the unmanned retail field such as unmanned shelves and intelligent retail cabinets. In the embodiments of the present application, both image recognition and image segmentation technologies will be applied to the field of rock identification.

"Artificial Intelligence (AI)" is a theory, method, technology and application system that uses digital computers or machines controlled by digital computers to simulate, extend and expand human intelligence, perceive the environment, acquire and use knowledge to obtain optimal results. Artificial intelligence attempts to understand the essence of intelligence and to produce an intelligent machine that can respond in a manner similar to human intelligence. Artificial intelligence aims to make machines capable of perception, reasoning and decision making.

"Artificial intelligence technology" is a comprehensive discipline that involves a wide range of fields. The basic artificial intelligence technology includes, but not limited to, sensor technology, artificial intelligence chip technology, cloud computing technology, big data processing technology and mechatronics technology. The artificial intelligence technology applied in the embodiments of the present application is machine learning technology, and the machine learning device is applied in the computer device.

"Machine Learning (ML)" is an interdisciplinary subject that involves areas such as probability theory, statistics, algorithmic complexity theory and the like. The discipline of machine learning is dedicated to the study of how computers can simulate or implement human learning behaviors in order to enable computers to acquire new knowledge, reorganize existing knowledge structures, and thus improve their own performance. Machine learning is usually combined with deep learning, which usually includes technologies such as artificial neural networks, confidence networks, reinforcement learning, transfer learning, inductive learning, learning from instruction and the like.

"Spectrum" is a pattern in which dispersed monochromatic light is arranged according to wavelength size after polychromatic light passes through a dispersion system. The full name of spectrum is optical spectrum. In one embodiment of the present application, spectrum is obtained by spectral data acquisition device that performs measurement at the measurement points in the component area. For example, when a mineral component is irradiated by electromagnetic radiation, molecules inside the mineral experience quantum leaps between energy levels, which lead to emission, absorption or scattering, and radiation phenomena, thus generating a spectrum. Spectrum is realized as the visual representation of spectral data. In other words, while generating a spectrum, the spectral data acquisition device also generates corresponding spectral data and sends such spectral data to other computer devices.

"Database" refers to a virtual repository that organizes, stores and manages data according to data structure, which is a large, organized, shareable and centralized collection of data that is stored in a computer on a long term basis. In one embodiment of the present application, the computer device can access the spectral data database corresponding to molecular spectrum, in order to confirm and analyze the spectral data.

"Surface scanning", or "surface scanning analysis", is a mainstream method for precise identification of material components through test instruments. Typically, material components are sliced or made into samples with polished surfaces, and the components therein are precisely identified by surface scanning. Test instruments used for surface scanning include, but not limited to, molecular spectrum such as infrared spectrum and Raman spectrum, X-ray Fluorescence (XRF), Energy Dispersive X-ray Spectroscopy (EDS), etc. In some embodiments of the present application, the surface scanning procedure can be coupled with microscope or scanning electron microscope to combine microscopic observation with microanalysis.

In view of the cumbersome and professionally demanding identification procedure and low accuracy rate of manual rock identification methods in the prior arts, the present application provides a rock identification system and method that improve the accuracy of rock identification by generating multi-dimensional features in the rock identification procedure with the help of artificial intelligence-based image recognition technology.

FIG. 1 schematically shows a rock identification system provided by an exemplary embodiment of the present application. The system comprises an image acquisition device 101 and a computer device 102 which are connected to each other.

In the embodiments of the present application, the computer device is a terminal device for performing the rock identification method. The computer device has the functions of sending, receiving, and processing data.

Figure 2:
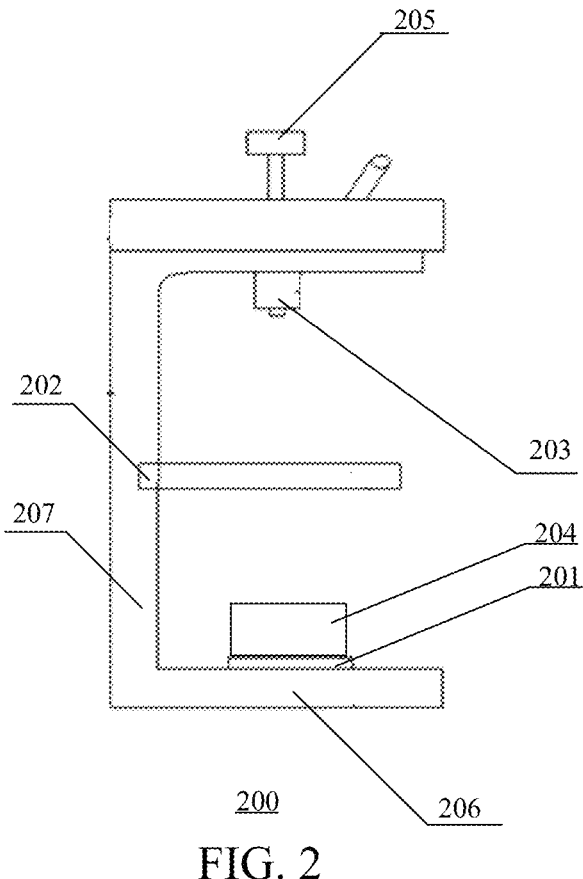
FIG. 2 schematically shows a structure of an image acquisition device provided by an exemplary embodiment of the present application.

The image acquisition device is a device that provides images to the computer device when the computer device performs the rock identification method. In one embodiment of the present application, the image acquisition device has the functions of taking images as well as sending images. In one embodiment, FIG. 2 schematically shows a structure of an image acquisition device 200 provided by an exemplary embodiment of the present application. The image acquisition device 200 comprises a first light source 201, a first stage 202, a first objective 203, a polarization device 204, a Charge-Coupled Device (CCD) camera 205, a first base 206, and a first support 207. Referring to FIG. 2, the first stage 202 is arranged in the center of the first support 207, and the first objective 203 is arranged on the top of the first support. The first objective 203 is provided therein with an analyzer, and at the bottom thereof a first mounting objective converter connected thereto. The CCD camera 205 is arranged on the top of the first objective 203. The polarization device 204 includes a polarizer and an analyzer, wherein the polarizer and the first light source 201 are arranged on the first base 206 which is connected to the bottom of the first support 207. When the image acquisition device 200 generates an image of a rock slice, the first light source 201 is activated to emit light, which passes through the polarizer and the analyzer, and is finally projected onto the rock slice. The rock slice is arranged on the top of the first stage 202, i.e., it is placed on the first stage 202. The CCD camera is in a first working mode, wherein the CCD camera, aiming to a position of the objective, captures a microscopic image of the corresponding rock slice as the rock slice image.

In the embodiments of the present application, the image acquisition device is in communication with the computer device. Based on this communication, the image acquisition device can send images to the computer device for storage. After the computer device receives the image from the image acquisition device, the image is processed to obtain features that are relevant to the present application and suitable for rock identification procedure, based on which the rock identification is performed.

Figure 3:
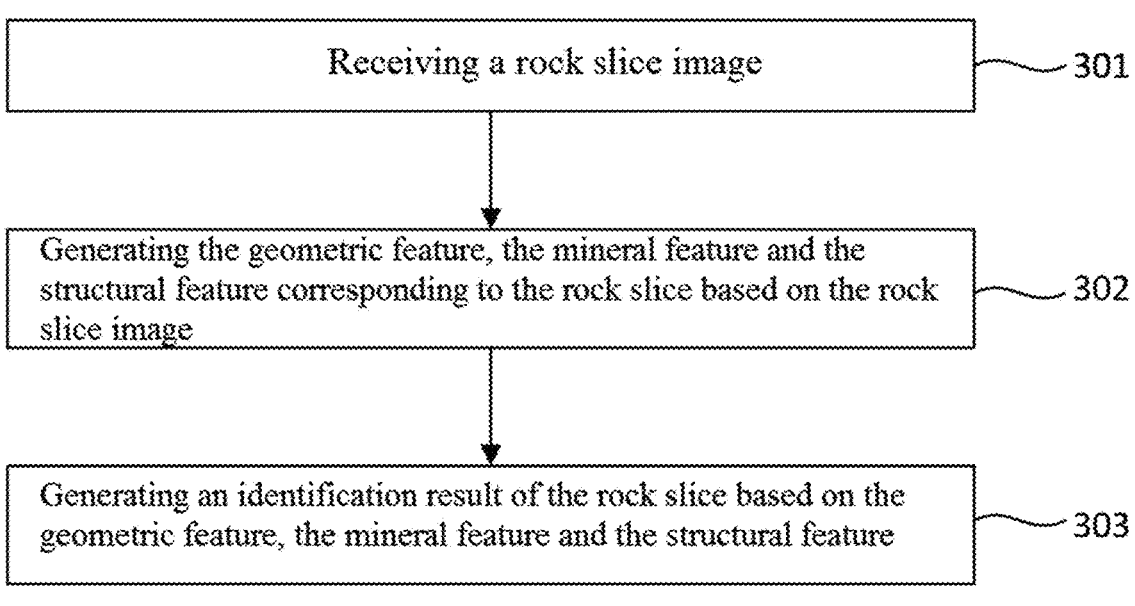
FIG. 3 is a flow chart showing a rock identification method provided by an exemplary embodiment of the present application.

Corresponding to the above rock identification system, FIG. 3 is a flow chart showing a rock identification method provided by an exemplary embodiment of the present application. The method, when applied to the computer device of the rock identification system, is illustrated as follows. The method comprises the following steps.

In Step 301, a rock slice image is received.

Figure 4:
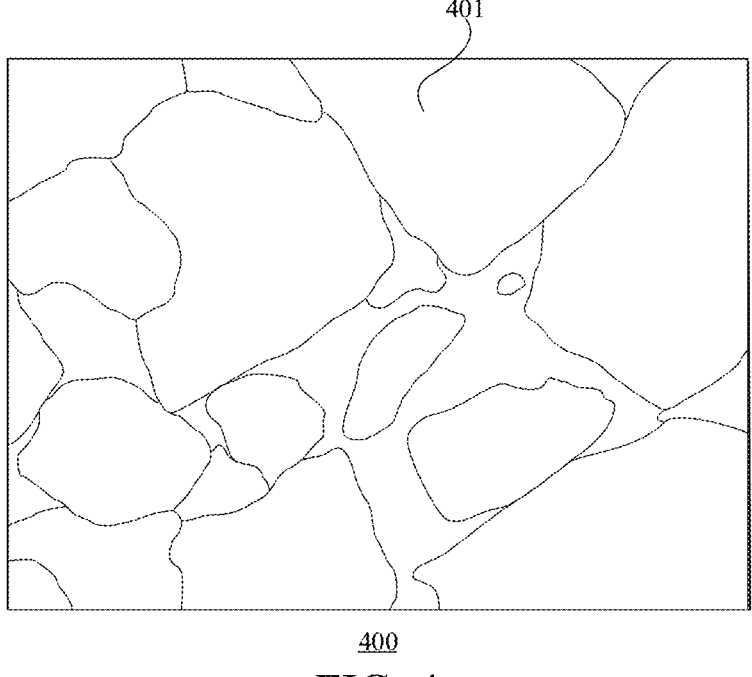
FIG. 4 schematically shows a structure of a rock slice image provided by an exemplary embodiment of the present application.

In one embodiment, before receiving the rock slice image from the image acquisition device, the computer device sends an image acquisition instruction to the image acquisition device. Upon receiving the image acquisition instruction, the image acquisition device acquires the image in response to the instruction, and sends the acquired image to the computer device. The computer device selects and processes the images transmitted by the image acquisition device to obtain the rock slice image finally. A rock slice is a slice obtained by cutting a rock sample, wherein components of the rock slice can represent and characterize components of the rock sample. Correspondingly, the rock slice image includes at least one component region which includes one component each. In one embodiment of the present application, components indicate the components corresponding to the rock. Referring to FIG. 4, the rock slice image 400, as a micrograph of the rock slice, includes a component region 401. In FIG. 4, there are 18 component regions, which may represent a same component, components different from each other, or at least two different components. The components in the component regions may be the same. The content contained in the component regions is not limited in the embodiments of the present application. In the embodiments of the present application, the components contained in the component regions may be embodied as mineral components or structural components. Optionally, when a component region includes a mineral component, the component region may indicate a category of mineral; and when a component region includes a structural component, the component region may indicate a category of particle, or a category of filler.

It should be noted that there are two rock slice images in the embodiments of the present application, i.e., a single polarized image and an orthogonally polarized image corresponding to the rock slice; or, there is one rock slice image in the embodiments of the present application, which is obtained by combining the single polarized image and the orthogonally polarized image corresponding to the rock slice. The actual presentation of the rock slice image is not limited in the embodiments of the present application; however, the rock slice image should present the anisotropy of the rock slice when it is exposed to ordinary light and polarized light sources.

In Step 302, the geometric feature, the mineral feature and the structural feature corresponding to the rock slice are generated based on the rock slice image.

In the embodiments of the present application, the computer device, upon receiving a rock slice image, will perform feature extraction on the rock slice image, corresponding to geometric features, mineral features, and structural features of the rock slice. Optionally, the geometric feature is used to indicate the divided regions of the rock slice based on components, the mineral feature is used to indicate the mineral identification result of the rock slice, and the structural feature is used to indicate the spatial structure of the rock sample. In the embodiments of the present application, the distribution of the component region in the rock slice image may represent the geometric feature, the specific type of mineral in the component region of the rock slice image may represent the mineral feature, and the spatial structure properties presented by the rock slice image may represent the structural feature. The specific geometric feature, mineral feature and structural feature are not limited in the embodiments of the present application.

In Step 303, the identification result of the rock slice is generated based on the geometric feature, the mineral feature and the structural feature.

In the embodiments of the present application, after the computer device determines the geometric feature, the mineral feature and the structural feature of the rock slice image, i.e. these features corresponding to the rock slice, the identification result of the rock slice is generated on the basis of the above features. The identification result includes textual description of the features of the rock sample. In one embodiment, the identification result comprises a name for the rock sample, and a textual summary of the geometric feature, the mineral feature and the structural feature. Optionally, the identification result is represented in the form of a list, or the identification result further comprises a visual image, represented in the form of a diagram. The method of generating the identification structure is not limited in the embodiments of the present application.

In summary, the method provided by the embodiments of the present application comprises the following steps. After a rock slice image is obtained, feature extraction for the rock slice image is performed based on features in three dimensions, i.e., the geometric feature, the mineral feature and the structural feature. The properties of the rock are determined from the perspective of micro-composition and macro-performance in the multiple-dimensional features, and ultimately the identification result including textual description is generated. In the procedure of rock identification, after the microscopic visualized image corresponding to the rock slice is obtained, extraction of multi-dimensional features is performed on the image. The rock slice is identified with reference to the multi-dimensional features, which improves the accuracy of rock identification.

Figure 5:
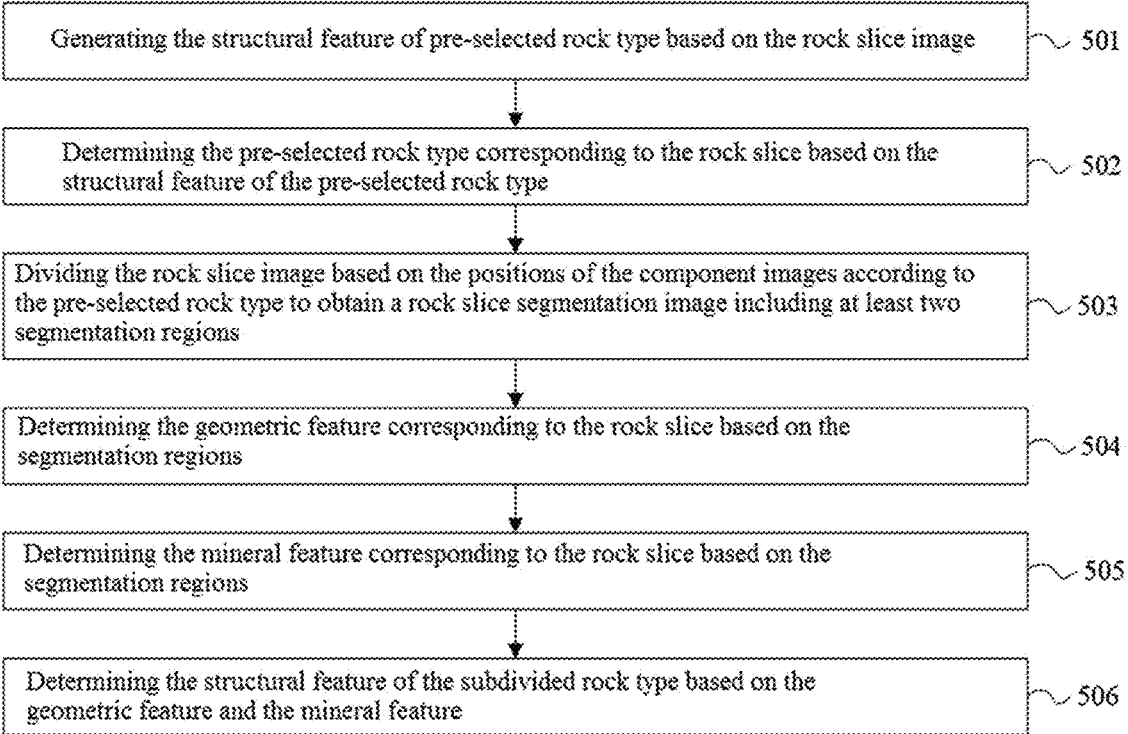
FIG. 5 is a flow chart of a method for determining a geometric feature, a mineral feature and a structural feature provided by an exemplary embodiment of the present application.

In some embodiments of the present application, there is a correlation between the geometric feature, the mineral feature and the structural feature. In one embodiment, the structural feature indicates a specific category of rock, while the geometric feature and the mineral feature may provide guidance for identification of the specific category of rock. In another embodiment, the mineral feature indicates a mineral corresponding to a component region, so the computer device should preferentially determine the geometric feature prior to the determination of the mineral feature. FIG. 5 is a flow chart of a method for determining the geometric feature, the mineral feature and the structural feature provided by an exemplary embodiment of the present application. The method can replace Step 302 as shown in FIG. 3, and can be carried out as Steps 501 to 506. The method comprises the following steps.

In Step 501, the structural feature of pre-selected rock type is generated based on the rock slice image.

In the embodiments of the present application, the structural feature includes a structural feature of pre-selected rock type and a structural feature of subdivided rock type, wherein the structural feature of pre-selected rock type is used to categorize the rock sample corresponding to the rock slice. The rock sample is categorized according to the pre-selected rock types, i.e., sedimentary rock, magmatic rock, and metamorphic rock.

In one embodiment, the rock slice image is input into a pre-selected rock type selection model to output a pre-selected rock type result, which indicates the structural feature of the pre-selected rock type corresponding to the rock slice. The pre-selected rock type structure selection model is a model constructed based on a sample set of pre-selected rock type images. After the rock slice image is input into the pre-selected rock type selection model, the pre-selected rock type selection model compares the rock slice image with sample images stored in the sample set, and then the structural feature of the pre-selected rock type is determined.

In Step 502, the pre-selected rock type corresponding to the rock slice is determined based on the structural feature of the pre-selected rock type.

In the embodiments of the present application, the pre-selected rock type result includes sedimentary rock, magmatic rock, and metamorphic rock. That is, the pre-selected rock types are divided into three rock types based on genesis. Corresponding to different structural features of the pre-selected rock type, the pre-selected rock type can be obtained. In one embodiment, the structural feature of pre-selected rock type is indicated by similarity to the corresponding pre-selected rock type.

In Step 503, the rock slice image is divided based on the positions of the components according to the pre-selected rock type, so as to obtain a rock slice segmentation image which includes at least two segmentation regions.

Optionally, the computer device can, after determining the pre-selected rock type, further determine the content of the component region corresponding to the pre-selected rock type, and the common shape of the component region. In one embodiment of the present application, the computer device segments the rock slice image based on the content and the common shape of the component region to obtain a rock slice segmentation image, which includes at least two segmentation regions. The segmentation regions are used to indicate the segmentation of the rock slice image based on the component regions thereof.

In Step 504, the geometric feature corresponding to the rock slice is determined based on the segmentation regions.

The geometric feature corresponding to the rock slice can be determined based on the determined segmentation regions, during which the computer device considers the segmentation regions as component regions for geometric feature identification. In this procedure, the geometric feature, after correspondingly processed by the computer device, may be used to characterize at least one of area, maximum diameter and shape of the component region.

In Step 505, the mineral feature corresponding to the rock slice is determined based on the segmentation regions.

After the geometric feature corresponding to the rock slice is determined, the mineral feature corresponding to the rock slice can be further determined based on the structural feature of the pre-selected rock type. In one embodiment of the present application, the mineral feature is used to indicate the mineral types of the components in the respective segmentation regions.

It should be noted that in some embodiments of the present application, the geometric feature corresponding to the rock slice is determined first, and then the mineral feature corresponding to the rock slice is determined. In some other embodiments of the present application, the mineral feature corresponding to the rock slice is determined first, and then the geometric feature corresponding to the rock slice is determined. In some further embodiments of the present application, the geometric feature and the mineral feature corresponding to the rock slice are determined at the same time. The order in which the geometric feature and the mineral feature are determined is not limited in the embodiments of the present application.

In Step 506, the structural feature of the subdivided rock type is determined based on the geometric feature and the mineral feature.

In the embodiments of the present application, the structural feature of the subdivided rock type can be further determined after the geometric feature and the mineral feature are determined. The structural feature of the subdivided rock type is used to indicate the subdivided rock type corresponding to the rock sample, i.e., a type that is further determined on the basis of genesis in combination with the rock component regions and the mineral components of the component regions.

Optionally, the geometric feature and the mineral feature are input into the subdivided rock type selection model to output the subdivided rock type result, which indicates the structural feature of the subdivided rock type corresponding to the rock slice. The subdivided rock type selection model is a model constructed based on the geometric-mineral feature interaction sample set, which indicates the correspondence between the combination of the geometric feature and the mineral feature, and the structural feature of the subdivided rock type. In one embodiment, the structural feature of the pre-selected rock type corresponding to the rock sample indicates that the rock sample is sedimentary rock. Through the subdivided rock type selection model, the structural feature of the subdivided rock type corresponding to the rock sample is obtained, indicating that the rock sample is clastic rock in sedimentary rock, based on the properties and the types of the segmentation regions in the rock sample slice.

Optionally, the pre-selected rock type and the subdivided rock type are both included in the identification result.

In summary, corresponding to the practical application of structural feature for rock identification, the method provided by the embodiments of the present application categorizes the structural feature as the structural feature of pre-selected rock type and the structural feature of subdivided rock type. After the structural feature of pre-selected rock type is determined, the geometric feature and the structural feature corresponding to the rock slice image are further determined, and then the structural feature of the subdivided rock type is determined. In this manner, the determination of the geometric feature and structural feature is more pertinent during the rock identification procedure, and the accuracy of the rock identification is further improved.

Next, the method for determining the geometric feature and the mineral feature involved in the embodiment shown in FIG. 5 is described in full detail.

As described in the above embodiments, the geometric feature is used to indicate the regional divisions of the rock slice based on components. In the present application, the geometric feature will be acquired by means of a neural network model based on machine learning. FIG. 6 is a flow chart showing a method for segmenting a rock slice image provided by an exemplary embodiment of the present application. The method may replace Steps 503 to 504 in the embodiment shown in FIG. 5. The method, when applied to a computer device, is illustrated as follows. Referring to FIG. 6, the method comprises the following steps.

In Step 601, a sample slice image marked with a sample segmentation result is obtained.

The construction and application of a rock slice image segmentation model will be specifically illustrated in the embodiments of the present application. The rock slice image segmentation model is a model for segmenting component regions. In one embodiment of the present application, the machine learning procedure is realized by means of sample training, after selecting the base network of the rock slice image segmentation model. Step 601 is a procedure of obtaining sample slice images, i.e., constructing a sample set.

In the embodiments of the present application, the sample slice image is an image selected according to the corresponding rock slice image. In one embodiment, the sample slice image is a rock slice image corresponding to the pre-selected rock type of the rock slice. In another embodiment, the sample slice image is a rock slice image corresponding to the subdivided rock type of the rock slice. The specific rock types corresponding to the sample slice image are not limited in the embodiments of the present application.

Optionally, the sample slice image is marked with a sample segmentation result, i.e., segmentation based on component regions of the sample slice image after judged by other means.

In Step 602, the sample slice image is input into the rock slice image segmentation model to output a predicted segmentation result.

Figure 7:
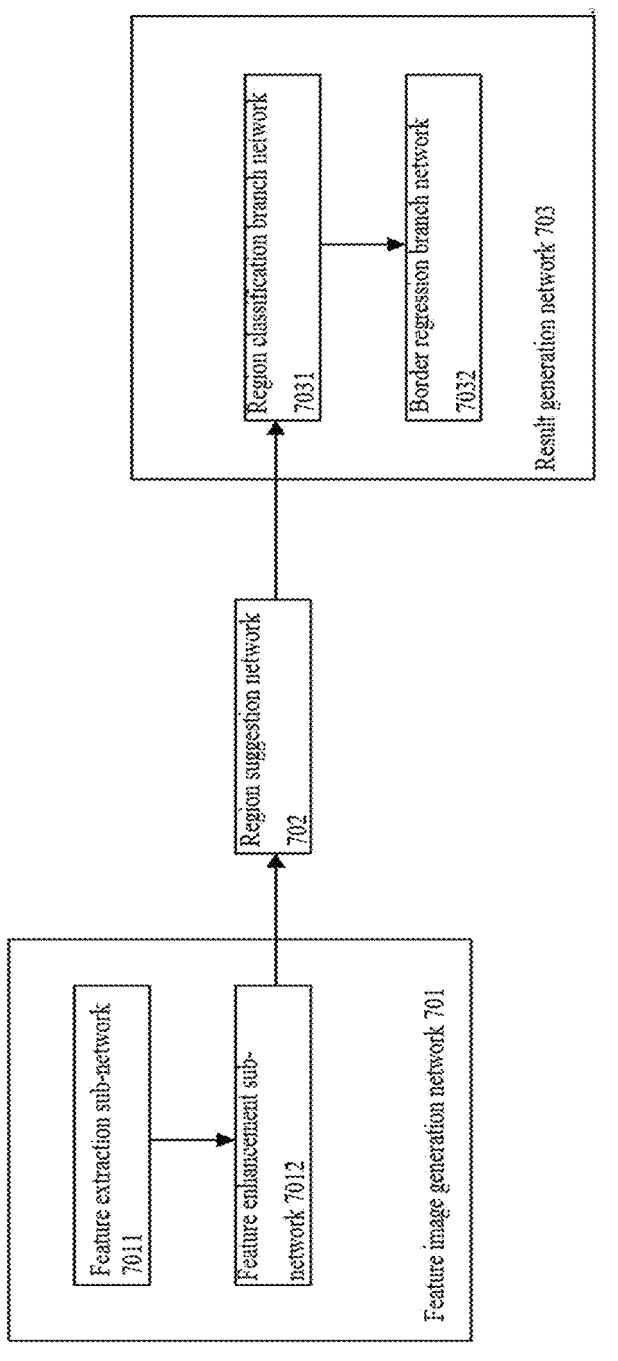
FIG. 7 is a block diagram showing a structure of an image segmentation model provided by an exemplary embodiment of the present application.

In the embodiments of the present application, the rock slice image segmentation model is a Mask-RCNN network model based on machine learning. In one embodiment according to FIG. 7, the rock slice image segmentation model 700 includes a feature image generation network 701, a region suggestion network 702 and a result generation network 703, which are three sub-networks interconnected in the rock slice image segmentation model. Among them, the feature image generation network 701 includes a feature extraction sub-network 7011 and a feature enhancement sub-network 7012, and the result generation network 703 includes a result region classification branch network 7031 and a border regression branch network 7032.

When obtaining the segmentation result through the rock slice image segmentation model, the rock slice image will be transmitted through the feature image generation network after entering the rock slice image segmentation model. In the feature extraction sub-network, the feature image corresponding to the rock slice image can be obtained after the surface feature extraction in the feature extraction sub-network and the feature enhancement in the feature enhancement sub-network. Subsequently, the feature image is input into the region suggestion network, and the output is obtained as a pre-segmented feature image corresponding to the slice to be tested. After convenient thinning, the pre-segmented feature image is input into the region classification branch network. After property classification by the region classification branch network and correction by the border regression branch network on the pre-segmented feature image, the segmentation result is finally output.

In the embodiments of the present application, the predicted segmentation result is obtained by inputting the sample slice image into the completed rock slice image segmentation model. The predicted segmentation result may be output in the form of a rock sample slice superimposed with segmentation lines.

In Step 603, a segmentation difference is obtained by comparing the difference between the predicted segmentation result and the sample segmentation result.

In this procedure, the predicted segmentation result is compared with the sample segmentation result to determine the differences therebetween. The difference between the predicted segmentation result and the sample segmentation result may exist if the parameter adjustment has not been completed conducted by the rock slice image segmentation model. In one embodiment, the segmentation difference is realized as a difference in the length of the segmentation lines in the rock slice segmentation image. In another embodiment, the segmentation difference is realized as a difference in the shape of the segmentation lines in the rock slice segmentation image. The specific form of segmentation difference is not limited in the embodiments of the present application.

In Step 604, the rock slice image segmentation model is adjusted based on the segmentation difference.

In the embodiments of the present application, whether the training of the rock slice image segmentation model is completed is determined based on the segmentation difference. If the training of the rock slice image segmentation model is not completed, the training procedure of the model is further performed by continuing to input the sample slice image into the rock slice image segmentation model, outputting other predicted segmentation result and then comparing the difference therebetween. Optionally, in other embodiments of the present application, it is also possible to determine whether the training of the rock slice image segmentation model is completed based on the number of times the rock slice image segmentation model has been trained. In one embodiment of the present application, the training of the rock slice image segmentation model is determined to be completed in response to a segmentation difference indicating a threshold of difference between the predicted segmentation result and the sample segmentation result; or, the training of the rock slice image segmentation model is determined to be completed in response to the number of sample slice image inputs to the rock slice image segmentation model in a segmentation training period reaching a threshold of the number of segmentations.

It should be noted that the "threshold value" in the present application may be realized as a threshold value stored in a computer program, or as a manually input threshold value when the computer device performs corresponding steps. The specific method of acquiring the threshold value is not limited in the embodiments of the present application.

After determining that the training of the rock slice image segmentation model is completed, the rock slice image to be tested is input and segmented for extraction of set features.

In Step 605, the rock slice image is input into the rock slice image segmentation model in response to the completed training of the rock slice image segmentation model, and an output is obtained as the rock slice segmentation image.

Figure 8:
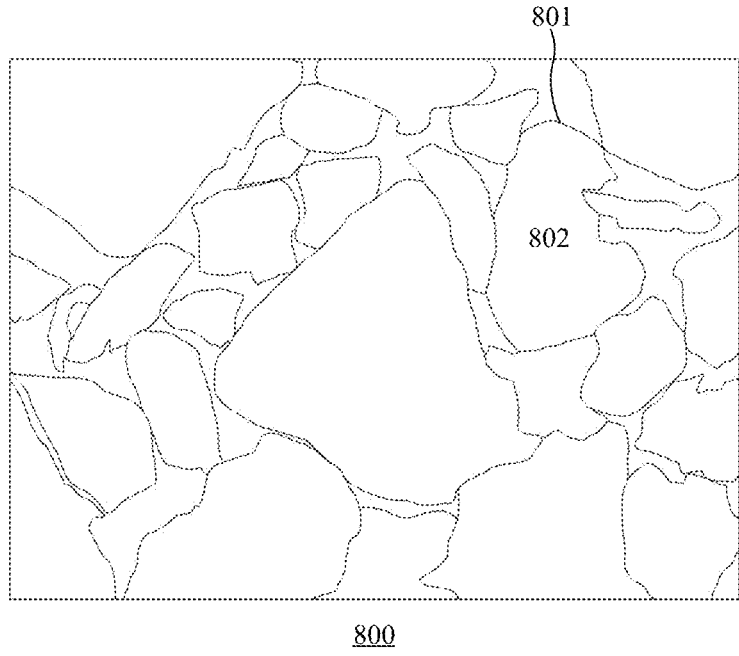
FIG. 8 schematically shows a rock slice segmentation image after being segmented provided by an exemplary embodiment of the present application.

Step 605 is a procedure of generating a rock slice segmentation image corresponding to the rock slice. The rock slice segmentation image includes at least two segmentation regions. As mentioned above, the segmentation regions indicate segmentation determined based on the component regions. When the training of the rock slice image segmentation model is completed, the segmentation regions can directly represent the component regions. As shown in FIG. 8, a plurality of component regions 802 are formed by segmentation lines 801 in rock slice segmentation image 800 obtained by the rock slice image segmentation model. In FIG. 8, for example, a region completely surrounded by segmentation lines 801 is component region 802.

After the rock slice segmentation image is obtained, the segmentation result corresponding to the rock slice image can be generated. The segmentation result includes at least one of a number of the component regions corresponding to the rock slice image, a distribution density of the component regions corresponding to the rock slice image, and a size of the component regions corresponding to the rock slice image. In one embodiment, the above segmentation result may directly indicate the geometric feature corresponding to the rock slice, or, the above segmentation result may be processed to generate the geometric feature corresponding to the rock slice.

In summary, according to the method provided by the embodiments of the present application, in the procedure of identifying a rock slice image, the rock slice image is segmented through a rock slice image segmentation model based on a Mask-RCNN network to obtain the geometric feature corresponding to the rock slice. On the basis of applying an image segmentation method in a computer instead of a manual segmentation method, a Mask-RCNN network model for image processing based on machine learning is introduced, which provides better guidance for segmenting component regions in the rock slice image, and improves the efficiency of obtaining the geometric feature.

Optionally, the embodiment shown in FIG. 6 in the present application is an embodiment of obtaining the geometric feature by a computer device. In other embodiments of the present application, the geometric feature may be obtained by other methods. The specific method of obtaining the geometric feature is not limited in the embodiments of the present application.

In the embodiments of the present application, since the geometric feature indicates the segmentation of component regions and each component region corresponds to a different component, the mineral feature is determined, i.e., the distribution of minerals in the rock slice is determined, after the geometric feature is determined.

In one embodiment of the present application, the mineral feature is determined by a neural network model based on machine learning. FIG. 9 is a flow chart showing a method of identifying the mineral feature provided by an exemplary embodiment of the present application, which may be alternatively realized as Step 505 in the embodiment shown in FIG. 5. The method, when applied to a computer device, is illustrated as follows. The method comprises the following steps.

In Step 901, a component image is determined based on the segmentation regions, and the component image includes one component region.

In the embodiments of the present application, as shown in FIG. 10, segmentation region 1001 indicates the segmentation result determined based on rock slice segmentation image 1000, and can be used to determine component image 1010 which includes one component region. Since the rock slice image segmentation model has been trained, the component region corresponds to the component region contained in the rock slice, directly representing the component in the rock slice.

In Step 902, a sample component image marked with sample component type feature is obtained.

In the embodiments of the present application, the component type identification model is used to determine the component type feature corresponding to the component region, i.e., the mineral component corresponding to the component region. Optionally, the component type identification model is constructed in a manner similar to the rock slice image segmentation model, both based on machine learning for sample training. In the embodiments of the present application, the sample component image is selected from a sample component image dataset, and each sample component image includes and only includes one component region that corresponds to the sample component type feature.

In Step 903, the sample component image is input into the component type identification model, and the output is obtained as a predicted component type feature.

In the embodiments of the present application, the predicted component type feature is obtained by identifying the sample component image through the component type identification model in a training procedure. In the embodiments of the present application, the stratum neural network that can be selected for the component type identification model includes at least one of a Mobilenet neural network, a Resnet neural network and a VGG (Visual Geometry Group Network) neural network.

In Step 904, the predicted component type feature is compared with the sample component type feature to obtain an identification difference.

In this procedure, the difference between the predicted component type feature and the sample component type feature is identified. In one embodiment, the component type feature is characterized in numerical forms, with different values characterizing different component types and a probability that a component region belongs to the component type. In this case, the identification difference may indicate a difference between the predicted component type feature and the sample component type feature, or, a ratio of the predicted component type feature to the sample component type feature. The actual form of output of the component type feature is not limited in the embodiments of the present application.

In Step 905, the component type identification model is adjusted based on the identification difference.

In this procedure, the component type identification model is adjusted according to the component type identification difference, until the difference is less than a difference threshold, or the number of training of the component type identification model reaches a threshold of the number of training. When the above conditions are satisfied, or one of the above conditions is satisfied, it can be determined that the training of the component type identification model is completed.

In Step 906, in response to the completed training of the component type identification model, the component image is input into the component type identification model, and the output is obtained as the component type feature of the component image.

In this procedure, the component type feature is output. It should be noted that the embodiments of the present application is focused on the identification of one single component in the component image. Therefore, when the component image inevitably includes two component regions, the component type identification model will identify the above two component regions collectively, or, the component type identification model will select an image region corresponding to either one of the above two component regions for an individual identification. Corresponding to the component identification at one time, the component type identification model will output and only output one component type feature.

In Step 907, the mineral feature corresponding to the rock slice is determined based on the component type feature corresponding to the component image.

Optionally, a correspondence between the component type feature and the mineral type is stored in the computer device. When the component type feature is output, the computer device can determine the mineral type corresponding to the component region based on the correspondence between the component type feature and the mineral type.

After the mineral types of all component regions corresponding to the rock slice image are determined, the mineral feature corresponding to the rock slice can be obtained.

In summary, according to the method provided by the embodiments of the present application, corresponding to a single component region, the component identification is carried out by inputting the component region into the component type identification model, and the output is obtained as the component type feature indicating the mineral feature of the component region. By inputting a component image comprising a single component region, and performing identification of a specific type of a component particle with the aid of an identification model based on machine learning, the efficiency of identifying component in rock slice is improved.

Figure 11:
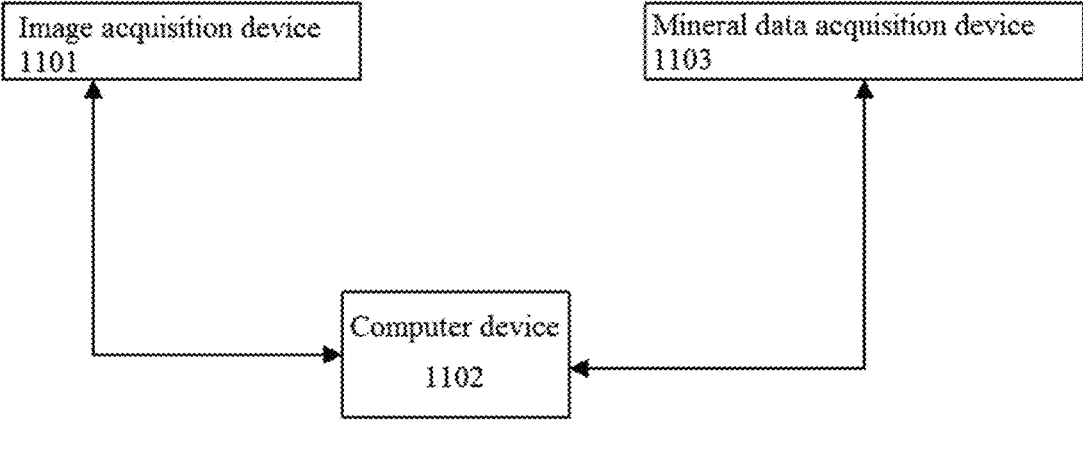
FIG. 11 schematically shows another rock identification system provided by an exemplary embodiment of the present application.
Figure 12:
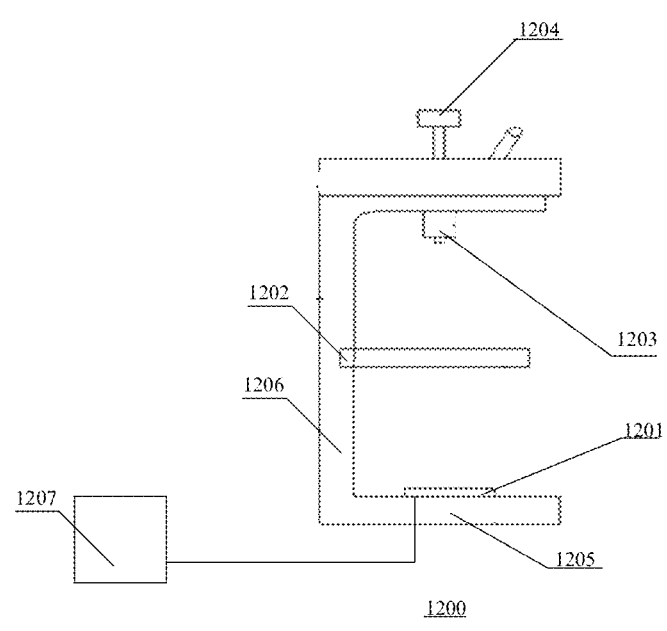
FIG. 12 schematically shows a mineral data acquisition device provided by an exemplary embodiment of the present application.

In other embodiments of the present application, the pre-selected determination of the mineral feature is performed by the classification and identification model, and then the pre-selected determination result of the classification and identification model is verified through a mineral data acquisition device. In this case, the rock identification system also includes a mineral data acquisition device. FIG. 11 is a block diagram showing a structure of a rock identification system provided by an exemplary embodiment of the present application. The rock identification system comprises an image acquisition device 1101, a computer device 1102 and a mineral data acquisition device 1103, wherein the image acquisition device 1101 and the mineral data acquisition device 1103 are connected to the computer device 1102, respectively. Correspondingly, FIG. 12 schematically shows a mineral data acquisition device 1200 provided by an exemplary embodiment of the present application. The mineral data acquisition device 1200 comprises a second light source 1201, a second stage 1202, a second objective 1203, a photoelectric signal converter 1204, a second base 1205 and a second support 1206. The second light source 1201 corresponds to a second optical path 1207, an endpoint of which is projected to the second stage 1202. The second stage 1202 is located in a center of the second support 1206, and the second objective 1203 is located on a top of the second support 1206. A bottom of the second objective 1203 is provided with a second mounting objective converter connected to the second objective 1203. The photoelectric signal converter 1204 is arranged at a top of the second objective 1203. When the mineral data acquisition device 1200 generates the mineral data, the rock slice is arranged at a top of the second stage 1202, and the photoelectric signal converter 1204 is in a second working mode for spectral data acquisition. In the embodiments of the present application, the second working mode refers to a mode when the photoelectric signal converter 1204 performs data acquisition.

It should be noted that the mineral data acquisition device and the image acquisition device may be the same device, i.e., the mineral data acquisition device and the image acquisition device share a first stage, a first objective, a first base and a first support. Both the CCD camera and the photoelectric signal converter are arranged on the first objective. An integrated device consisting of the mineral data acquisition device and the image acquisition device can obtain the rock slice image and the spectral data, which are transmitted to the computer device together.

Based on the rock identification system as described above, FIG. 13 is a flow chart schematically showing an identification method for determining the mineral feature corresponding to a rock slice provided by an exemplary embodiment of the present application. The method may be alternatively realized as Step 505 in the embodiment corresponding to FIG. 5. The method, when applied to a computer device, is illustrated as follows. The method comprises the following steps.

In Step 1301, the rock slice segmentation image is input into the classification and identification model, and the output is obtained as a monocrystalline component collection image and a non-monocrystalline component collection image.

In the embodiments of the present application, the classification and identification model is used to differentiate component regions belonging to different crystalline types in the rock slice segmentation image.

In general, the rock is embodied as a multi-component mixture, in which the components can be divided into monocrystalline components and non-monocrystalline components based on the macroscopic morphology of the crystals within the component regions. Optionally, the non-monocrystalline component comprises a polycrystalline component and an amorphous component. In one embodiment, the classification and identification model includes a crystalline component classification model for distinguishing the components as monocrystalline components and non-monocrystalline components. The classification and identification model further includes a non-monocrystalline component classification model for distinguishing the non-monocrystalline components as polycrystalline components and amorphous components. In addition, a monocrystalline component identification model, a polycrystalline component identification model, and an amorphous component identification model are provided correspondingly, so as to identify the specific mineral types corresponding to the component regions.

In this case, for different rock types, the classification sub-model and the identification sub-model in the classification and identification model can be configured to adapt to different component regions contained in different rock types. An example is illustrated as follows when the rock type of the rock slice is clastic rock.

Figure 14:
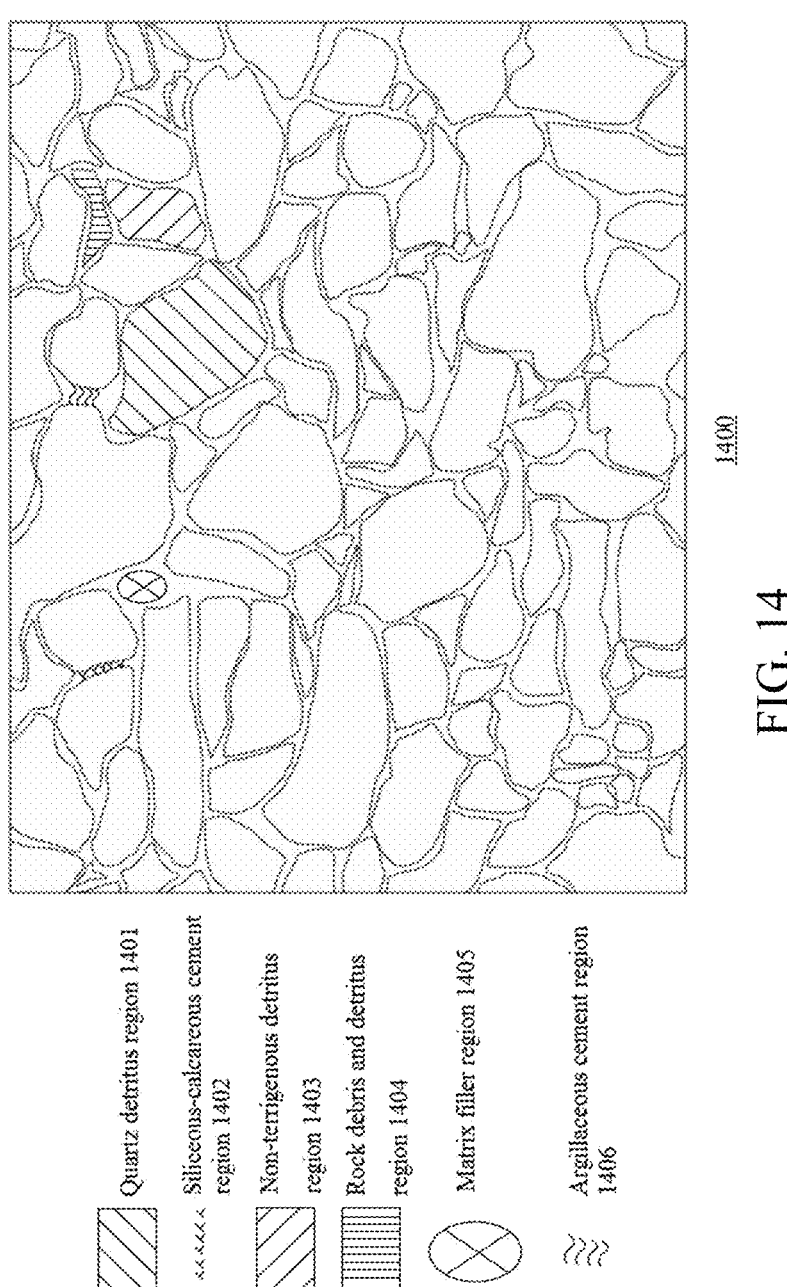
FIG. 14 schematically shows a rock slice corresponding to clastic rock provided by an exemplary embodiment of the present application.

The components indicated by the component regions in the elastic rock include the detritus components and the filler components. In this case, the detritus is a component of sedimentary rock or sediment, and a product of mechanical weathering of the parent rock. The filler is a connecting material located between the detritus. In subsequent subdivision, the detritus components are divided into terrigenous detritus components and non-terrigenous detritus components. Among them, terrigenous detritus refers to detritus formed by parent rock in terrigenous areas after physical weathering or mechanical damage, and mainly includes quartz, feldspar, and rock debris, etc. Non-terrigenous detritus refers to detritus formed by parent rock in non-terrigenous areas after physical weathering or mechanical damage, and mainly includes endogenous elastic rock, volcanic debris, etc. Meanwhile, the filler components are divided into cement components and matrix components, wherein the matrix indicates fine mechanical admixtures that fill in between the detritus particles. In the embodiments of the present application, the matrix may be realized as at least one of silt, clay, fines and carbonate lime mud. The cement indicates the location of chemical precipitation in the filler other than the matrix. Moreover, the cement components are further divided into siliceous-calcareous components and argillaceous components according to the compositions thereof. The terrigenous detritus components are further divided into quartz-feldspar components and rock debris components according to the detritus morphology. In other words, for elastic rock, the classification and identification model needs to have the ability to identify quartz-feldspar detritus region, siliceous-calcareous cement region, non-terrigenous detritus region, rock debris and detritus region, matrix filler region and argillaceous cement region. FIG. 14 schematically shows a rock slice corresponding to elastic rock, which includes various components, provided by an exemplary embodiment of the present application. As shown in FIG. 14, the clastic rock slice 1400 includes a quartz detritus region 1401, a siliceous-calcareous cement region 1402, a non-terrigenous detritus region 1403, a rock debris and detritus region 1404, a matrix filler region 1405, and an argillaceous cement region 1406.

Figure 15:
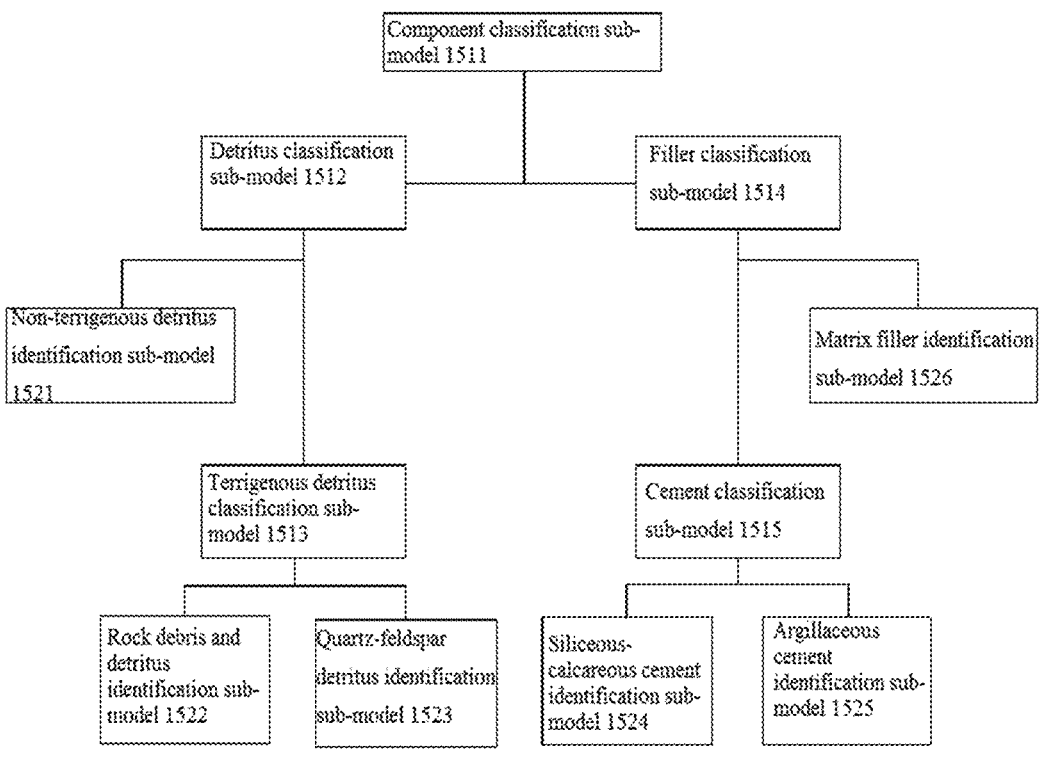
FIG. 15 schematically shows a structure of a rock identification model corresponding to clastic rock provided by an exemplary embodiment of the present application.

When the rock type is elastic rock as shown in FIG. 15, the rock identification model 1500 includes a classification sub-model group and an identification sub-model group. The classification sub-model group includes a component classification sub-model 1511, a detritus classification sub-model 1512, a terrigenous detritus classification sub-model 1513, a filler classification sub-model 1514 and a cement classification sub-model 1515. The identification sub-model group includes a non-terrigenous detritus identification sub-model 1521, a rock debris and detritus identification sub-model 1522, a quartz-feldspar detritus identification sub-model 1523, a siliceous-calcareous cement identification sub-model 1524, an argillaceous cement identification sub-model 1525, and a matrix filler identification sub-model 1526. Among them, the component classification sub-model 1511 is connected to the detritus classification sub-model 1512 and the filler classification sub-model 1514, the detritus classification sub-model 1512 is connected to the non-terrigenous detritus identification sub-model 1521 and the terrigenous detritus classification sub-model 1513, the terrigenous detritus classification sub-model 1513 is connected to the rock debris and detritus identification sub-model 1522 and the quartz-feldspar detritus identification sub-model 1523, the filler classification sub-model 1514 is connected to the cement classification sub-model 1515 and the matrix filler identification sub-model 1526, and the cement classification sub-model 1515 is connected to the siliceous-calcareous cement identification sub-model 1524 and the argillaceous cement identification sub-model 1525, respectively.

In this embodiment, after the rock slice segmentation image is input into the rock identification model, each classification sub-model will generate a sub-image of the corresponding classification by dividing and reorganizing the rock slice segmentation image, so as to determine the corresponding regions in the rock slice segmentation image. Each identification sub-model has a corresponding sub-image to determine a specific component type. That is, the above procedure can be realized as follows. The clastic rock slice is input into the component classification sub-model, which outputs the detritus sub-image and the filler sub-image. The detritus sub-image is input into the detritus classification sub-model, which outputs the non-terrigenous detritus sub-image and the terrigenous detritus sub-image. The terrigenous detritus sub-image is input into the terrigenous detritus classification sub-model, which outputs the rock debris and detritus sub-image and the quartz-feldspar detritus sub-image. The filler sub-image is input into the filler classification sub-model, which outputs the matrix filler sub-image and the cement sub-image. The cement sub-image is input into the cement classification sub-model, which outputs the siliceous-calcareous cement sub-image and the argillaceous cement sub-image. The non-terrigenous detritus sub-image is input into the non-terrigenous detritus identification sub-model, which outputs the non-terrigenous detritus identification result, and determines the non-terrigenous detritus region based on the non-terrigenous detritus identification result. The rock debris sub-image is input into the rock debris and detritus identification sub-model, which outputs the rock debris and detritus identification result, and determines the rock debris region based on the rock debris and detritus identification result. The quartz-feldspar sub-image is input into the quartz-feldspar detritus identification sub-model, which outputs the quartz-feldspar detritus identification result, and determines the quartz-feldspar detritus region based on the quartz-feldspar detritus identification result. The matrix filler sub-image is input into the matrix filler identification sub-model, which outputs the matrix filler identification result, and determines the matrix filler region based on the matrix filler identification result. The siliceous-calcareous cement sub-image is input into the siliceous-calcareous cement identification sub-model, which outputs the siliceous-calcareous cement identification results, and determines the siliceous-calcareous cement region based on the siliceous-calcareous cement identification results. The argillaceous cement sub-image is input into the argillaceous cement identification sub-model, which outputs the argillaceous cement identification result, and determines the argillaceous cement region based on the argillaceous cement identification result. The monocrystalline component regions are determined based on the quartz-feldspar detritus region and the siliceous-calcareous cement region. The non-monocrystalline component regions are determined based on the non-terrigenous detritus region, the rock debris and detritus region, the argillaceous cement region and the matrix filler region.

According to the practical properties of the clastic rock, the quartz-feldspar detritus region and the siliceous-calcareous cement region belong to the monocrystalline component region; and the non-terrigenous detritus region, the rock debris and detritus region, the argillaceous cement region and the matrix filler region belong to the non-monocrystalline component region.

That is, in one embodiment of the present application, the monocrystalline component collection image includes at least one monocrystalline component region, and the monocrystalline component identification result corresponding to the monocrystalline component region; and the non-monocrystalline component region includes at least one non-monocrystalline component region, and the non-monocrystalline component identification result corresponding to the non-monocrystalline component region.

It should be noted that the classification and identification model or the various sub-models that constitute the classification and identification model in the embodiments of the present application are all deep learning-based neural network models.

In Step 1302, a scanning instruction is transmitted to the mineral data acquisition device based on the monocrystalline component collection image.

Since the image features corresponding to the monocrystalline component region are not protruding, the scanning data should be collected by the mineral data acquisition device for the monocrystalline component collection image. Optionally, the scanning data is the spectral data collected by the mineral data acquisition device. In one embodiment of the present application, the mineral data acquisition device may also be realized as at least one of the devices including, but not limited to, molecular spectrum such as infrared spectrum and Raman spectrum, X-ray Fluorescence (XRF), Energy Dispersive X-ray Spectroscopy (EDS), etc. The computer device sends a scanning instruction to the mineral data acquisition device. The scanning instruction indicates to the mineral data acquisition device the location of a component region corresponding to the monocrystalline component collection image.

Optionally, impurities are inevitably introduced during the production of the rock slice, and the minerals corresponding to the monocrystalline components are prone to alteration (a phenomenon in which a mineral is subjected to external influences that cause change in compositions to form a new mineral; in one embodiment, feldspar changes into clay minerals), twin crystal (a phenomenon that refers to the regular concatenation of two or more crystals of the same kind, wherein the junction of the crystals may cause interference with data collection; in one embodiment, plagioclase includes polysynthetic twin), inclusion (a phenomenon referring to a closed system in which a mineral consists of one or more phases of material with phase boundaries to the host crystal mineral; in one embodiment, quartz includes rutile inclusions), and crack (a phenomenon in which a mineral fractures due to an external stress force; in one embodiment, quartz includes cracks), which will affect the data acquisition results of the mineral data acquisition device. Therefore, before generating the scanning instruction, the monocrystalline component collection image is first input into a region selecting model to obtain a region selecting result and determine a portion of the monocrystalline component collection image that is suitable for scanning, i.e., the region selecting result indicates a clean region in the monocrystalline component collection image. In this case, the computer device generates a scanning instruction based on the region selecting result and sends the scanning instruction to the mineral data acquisition device.

In Step 1303, the scanning data fed back by the mineral data acquisition device based on the scanning instruction is received.

In one embodiment, after the mineral data acquisition device receives the scanning instruction, the mineral data acquisition device moves the objective or the stage based on the scanning instruction, so that a corresponding region of the rock slice on the stage is located under the objective. Through irradiation of light source and signal conversion of the photoelectric signal converter, the scanning data is collected and fed back to the computer device. In the embodiments of the present application, the scanning data may be realized as spectral data.

In Step 1304, the monocrystalline component identification result is verified based on the scanning data to obtain the verification result.

The scanning data can be used to determine the component type in each component region in the monocrystalline component collection image from the chemical composition dimension or the crystal structure dimension, wherein each monocrystalline component region in the monocrystalline component collection image corresponds to the scanning data indicating the chemical composition of the region. Therefore, the scanning data can determine the monocrystalline identification result in each monocrystalline component in the monocrystalline component set.

In Step 1305, the mineral feature corresponding to the rock slice is determined based on the non-monocrystalline component identification result, the monocrystalline component identification result and the verification result.

When the verification result is the same as the monocrystalline component identification result, the verification result indicates that the verification is passed, and the monocrystalline component identification result is unchanged.

When the verification result is different from the monocrystalline component identification result, the verification result indicates that the verification fails. In the embodiments of the present application, the monocrystalline component identification result is determined based on an identification result generation rule, which is a determination rule generated based on the effect of the mineral data acquisition device on the monocrystalline component identification result. The rule is generated because the scanning data generation result of the mineral data acquisition device is greatly influenced by the specific types of the mineral data acquisition device.

After determining the mineral type corresponding to each component region, the mineral type corresponding to each component region can be summarized, and then the mineral feature corresponding to the rock slice can be determined.

In summary, the method provided by the embodiments of the present application performs pre-selected identification of the rock slice segmentation image based on crystalline state through the classification and identification model, before determining the components of the rock slice segmentation image by surface scanning. After selecting the region corresponding to the monocrystalline component region, the component identification result is verified for a second time, thus the accuracy rate of the final mineral features is improved.

In other embodiments of the present application, the mineral feature is determined by searching and comparing in a spectral data database after the spectral data corresponding to the component regions are collected by the mineral data acquisition device. FIG. 16 is a flow chart showing a method of determining the mineral feature corresponding to component regions provided by an exemplary embodiment of the present application, which may be alternatively realized as Step 505 in the embodiment corresponding to FIG. 5. The method, when applied to a computer device, is illustrated as follows. The method comprises the following steps.

In Step 1601, a component image is determined based on the segmentation region, and comprises one component region.

In this procedure, the component region is segmented and determined based on the segmentation region in the rock slice segmentation image.

In Step 1602, a spectral data acquisition instruction is transmitted to the mineral data acquisition device based on the component image.

For each independent component region, the spectral data acquisition instruction is transmitted to the mineral data acquisition device after selecting a spectral data acquisition point in the component region.

In Step 1603, the spectral data transmitted by the mineral data acquisition device based on the spectral data acquisition instruction is received.

In the embodiments of the present application, the mineral data acquisition device obtains the corresponding spectral data and provides feedback to the computer device.

In Step 1604, the pre-selected mineral type corresponding to the component region is determined in the mineral spectral data database based on the spectral data.

In the embodiments of the present application, the mineral spectral data database is stored in the computer device, and a correspondence between the spectral data and the pre-selected mineral types is stored in the mineral spectral data database.

In the embodiments of the present application, the pre-selected mineral types are obtained by dividing the minerals based on typical properties thereof. Optionally, the computer device classifies a spectral data sample set in the spectral data database, and determines a rarity corresponding to the mineral based on the number of classifications of different minerals. Optionally, a division of one pre-selected mineral type comprises at least two subdivided mineral types.

In the embodiments of the present application, the procedure of obtaining the pre-selected mineral type is as follows.

Firstly, a first level category of the pre-selected mineral type corresponding to the component region is determined in the mineral spectral data database based on the spectral data. The first level category of the mineral type is a category determined based on how common the mineral is, and comprises common mineral category and uncommon mineral category. In the embodiments of the present application, the first level category of the mineral is determined by comparison with a first level category frequency threshold. Optionally, when the proportion of the spectral data corresponding to the mineral to the spectral data in the component region is greater than the first level category frequency threshold, i.e., when the frequency of the spectral data corresponding to the mineral is greater than the first level category frequency threshold, the first level category of the mineral is determined to be a common mineral. When the frequency of the spectral data corresponding to the mineral is less than or equal to the first level category frequency threshold, the first level category of the mineral is determined to be an uncommon mineral. In the embodiments of the present application, the common and uncommon mineral categories are determined based on the number of mineral samples in the spectral data database. That is, when the number of mineral samples in the spectral data database is less than a sample number threshold, the first level category of the mineral type is determined to be the uncommon mineral category, and when the number of mineral samples in the spectral data database is greater than or equal to the sample number threshold, the first level category of the mineral type is determined to be the common mineral category. Under this classification, the pre-selected mineral types corresponding to the common mineral category include mineral group type and common mineral type, and the pre-selected mineral types corresponding to the uncommon mineral category include inclusions mineral type, highly sensitive mineral type and alteration mineral type. Among them, the common mineral type indicates a pre-selected mineral type in the mineral spectral data database with a frequency greater than a frequency threshold of a certain pre-selected mineral type; the inclusions mineral type indicates a mineral type corresponding to a mineral as inclusions after mineral growth; the highly sensitive mineral type indicates a mineral type corresponding to a mineral that has an impact on the acquisition accuracy of the spectral data acquisition device due to chemical properties thereof in the procedure of obtaining the spectral data so that it would be the interest of the spectral data acquisition device; and the alteration mineral type indicates a mineral type corresponding to a mineral that generates an identifiable phenomenon in the procedure of mineral formation.

It should be noted that the "first level category frequency threshold" and the "mineral type frequency threshold" in the above procedure may be thresholds pre-stored in the computer device, or thresholds determined by signals received when the computer device performs the corresponding steps. The method of generating each threshold value is not limited in the embodiments of the present application.

Figure 17:
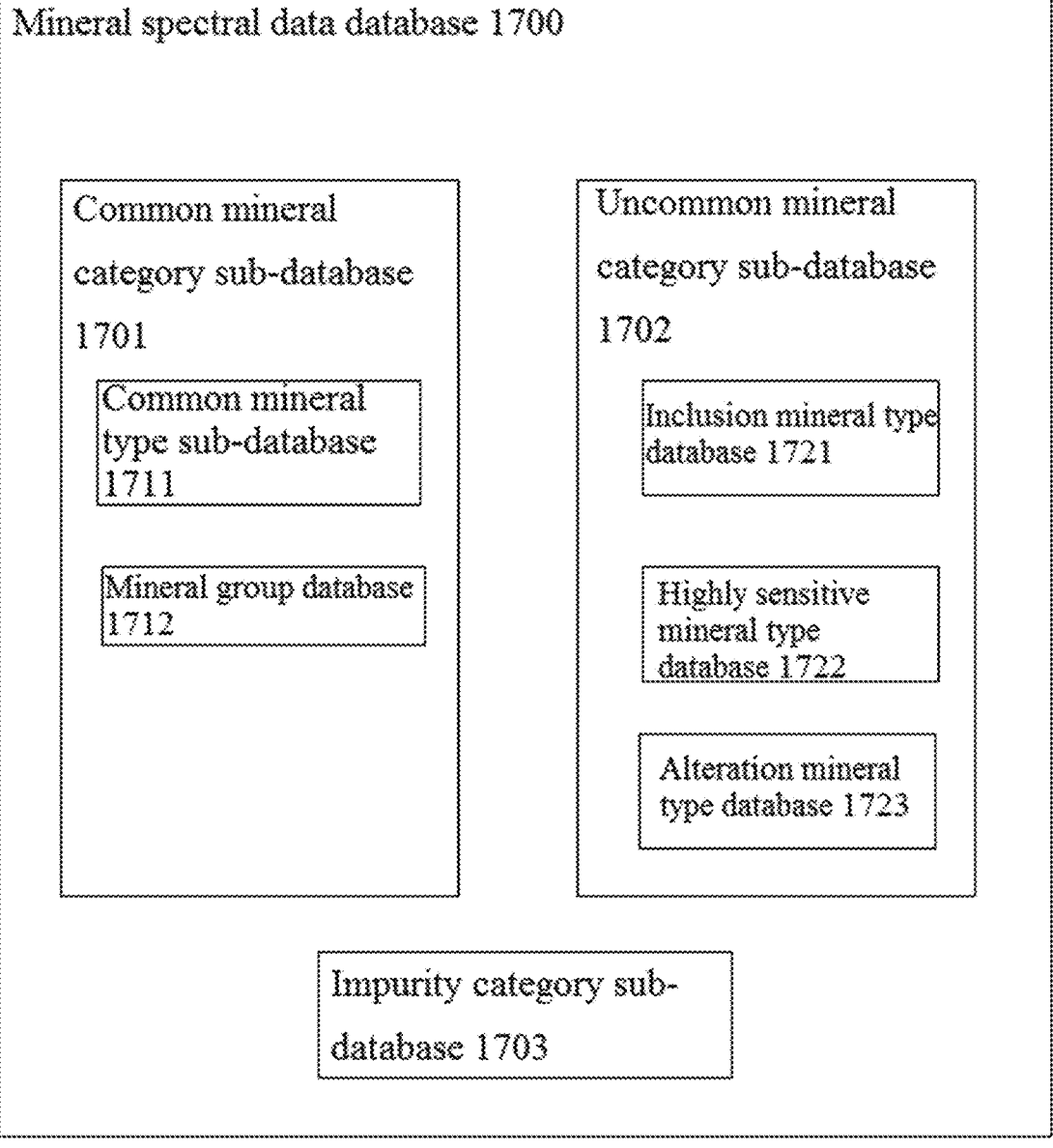
FIG. 17 schematically shows a structure of a mineral spectra database provided by an exemplary embodiment of the present application.

In the embodiments of the present application, the mineral spectral data database also comprises a plurality of corresponding sub-databases. According to FIG. 17, the mineral spectral data database 1700 includes a common mineral category sub-database 1701 and an uncommon mineral category sub-database 1702. The common mineral category sub-database 1701 further comprises a common mineral type sub-database 1711 and a mineral group database 1712. The uncommon mineral category sub-database 1702 further comprises an inclusion mineral type database 1721, a highly sensitive mineral type database 1722 and an alteration mineral type database 1723. In addition, the mineral spectral data database 1700 further includes an impurity category sub-database 1703 corresponding to the impurities. Since there are various types of impurities, when the impurity component contained in the clastic rock, for example, is silicon carbide, the impurity category sub-database 1703 is the identification database corresponding to silicon carbide.

In Step 1605, a mineral type verification ride corresponding to the pre-selected mineral category is determined.

In the embodiments of the present application, the mineral type verification rule includes a classification and verification rule, a direct verification rule, and a selected point re-verification rule, corresponding to the above pre-selected mineral types. When the pre-selected mineral type is a mineral group type, the mineral type verification rule is determined as the classification and verification rule; when the pre-selected mineral type is an inclusion mineral type, a highly sensitive mineral type or an alteration mineral type, the mineral type verification rule is determined as the selected point re-verification rule; and when the pre-selected mineral type is a common mineral type, or, the first level category corresponding to the pre-selected mineral type is an uncommon mineral type, and the pre-selected mineral type is not any one of the inclusions mineral type, the highly sensitive mineral type and the alteration mineral type, the mineral type verification rule is determined as the direct verification rule. In the embodiments of the present application, the selected point re-verification rule indicates a rule wherein the computer device re-acquires the scanning data from the spectral data acquisition device; the classification and verification rule indicates that the sub-database corresponding to the pre-selected mineral type is selected to carry out a secondary verification; and the direct verification rule indicates a rule wherein the result of the pre-selected mineral type is directly used as the verified result of the mineral type.

Among the above, when the pre-selected mineral type is the inclusion mineral type, or the highly sensitive mineral type, or the alteration mineral type, the corresponding verification rule is the selected point re-verification rule. That is, it is necessary to re-select the point in the component region, due to the special property of the crystals in the component region. The number of such re-selected points corresponds to the number of verification pre-stored in the computer device.

In the embodiments of the present application, the classification and verification rule is a rule for further subdivision of the mineral types based on sub-databases in the mineral spectral data database. Optionally, when the pre-selected mineral type is a mineral group type, the mineral type in the component region is subdivided based on the sub-database in the mineral group database, and the verification results are obtained. That is, this classification and verification rule applies to minerals of mineral group types.

In the embodiments of the present application, the direct verification rule is determined, when the pre-selected mineral type is a common mineral type, or the first level category of the mineral type is an uncommon mineral type, and the subdivided mineral type is not any one of the inclusions mineral type, the highly sensitive mineral type and the alteration mineral type. The direct verification rule is also a rule for determining the pre-selected mineral type as a subdivided mineral type.

In Step 1606, the mineral type corresponding to the component region is determined based on the mineral type verification rule and the pre-selected mineral type.

That is, in this procedure the mineral type corresponding to the component region is determined.

In Step 1607, the mineral feature corresponding to the rock slice is determined based on the mineral type corresponding to the component image.

That is, in this procedure the final mineral feature corresponding to the rock slice is determined based on the mineral type corresponding to each component region.

In summary, according to the method provided by the embodiments of the present application, after the spectral data corresponding to the component region is obtained, the mineral type of the component region corresponding to the database is preliminarily determined, and the verification rule is also determined. Based on the verification rule, the mineral type corresponding to the component region is finally determined. When determining the mineral type corresponding to the component region, the relevant verification rule is determined for each of the pre-selected types on the basis of the pre-selected type determined through the database, so that the subdivided mineral type is obtained. In this manner, the accuracy of mineral type identification can be improved, and the efficiency and accuracy of determining mineral features of the rock slice can also be improved.

It should be noted that the embodiments shown in FIG. 16, FIG. 13 and FIG. 9, as three parallel methods of identifying the mineral feature, can be applied in any combinations in the procedure of rock identification, so as to achieve the effect of identifying and verifying the mineral feature, and further improve the accuracy of determining the mineral feature of the rock slice. That is, the embodiments shown in FIG. 9, FIG. 13 and FIG. 16 are three embodiments for obtaining the mineral feature in the procedure of rock identification.

It should be noted that in some embodiments of the present application, the mineral feature and the geometric feature corresponding to the rock slice can be determined at the same time. FIG. 18 schematically shows a procedure for determining the geometric feature and the mineral feature provided by an exemplary embodiment of the present application. According to FIG. 18, the method comprises the following steps.

In Step 1801, a sample slice image is obtained.

In one embodiment of the present application, the rock slice image identification model is a neural network model based on machine learning. The neural network model may be obtained by combining the rock slice image segmentation model in the embodiment shown in FIG. 6 and the component type identification model in the embodiment shown in FIG. 9; alternatively, the neural network model may be constructed based on the parameters of the rock slice image segmentation model and the component type identification model. The sample for training the rock slice image identification model is the sample slice image marked with the sample segmentation result and the sample component type feature.

In Step 1802, the sample slice image is input into the rock slice image segmentation and identification model, which outputs the predicted segmentation region and the predicted component type feature.

That is, in this procedure the sample slice image is predicted through the untrained rock slice image identification model, so as to obtain the predicted segmentation region and the predicted component type feature.

In Step 1803, the predicted segmentation region is compared with the sample segmentation region to obtain the sample segmentation difference. The predicted component type feature is compared with the sample component type feature to obtain the sample component difference.

In the embodiments of the present application, the sample segmentation difference and the sample component difference are determined at the same time, since the predicted segmentation region and the predicted component type feature are output at the same time.

In Step 1804, the rock slice image segmentation and identification model is adjusted based on the sample segmentation difference and the sample component difference.

That is, in this procedure the rock slice image segmentation and identification model is adjusted.

In Step 1805, the rock slice image is input into the rock slice image segmentation and identification model, which outputs at least two segmentation regions corresponding to the rock slice image and the component type feature corresponding to the segmentation regions.

That is, in this procedure the rock slice image to be tested is input into the rock slice image segmentation and identification model, which outputs the segmentation regions and the component type feature corresponding to the regions.

In Step 1806, the geometric feature and the mineral feature corresponding to the rock slice are determined in combination with the segmented region and the component type feature.

In the embodiments of the present application, the segmentation region corresponds to the geometric feature, and the component type feature corresponds to the mineral feature.

In summary, according to the method provided by the embodiments of the present application, corresponding to a sample slice image as an input to the rock slice image segmentation and identification model, and on the premise that the training of the model is completed, the geometric feature and the mineral feature of the rock slice image are extracted at the same time, so as to further improve the efficiency of feature extraction in the procedure of rock identification.

Optionally, the embodiment shown in FIG. 18 in the present application is an embodiment in which a computer device obtains the geometric feature and the mineral feature at the same time.

Figure 19:
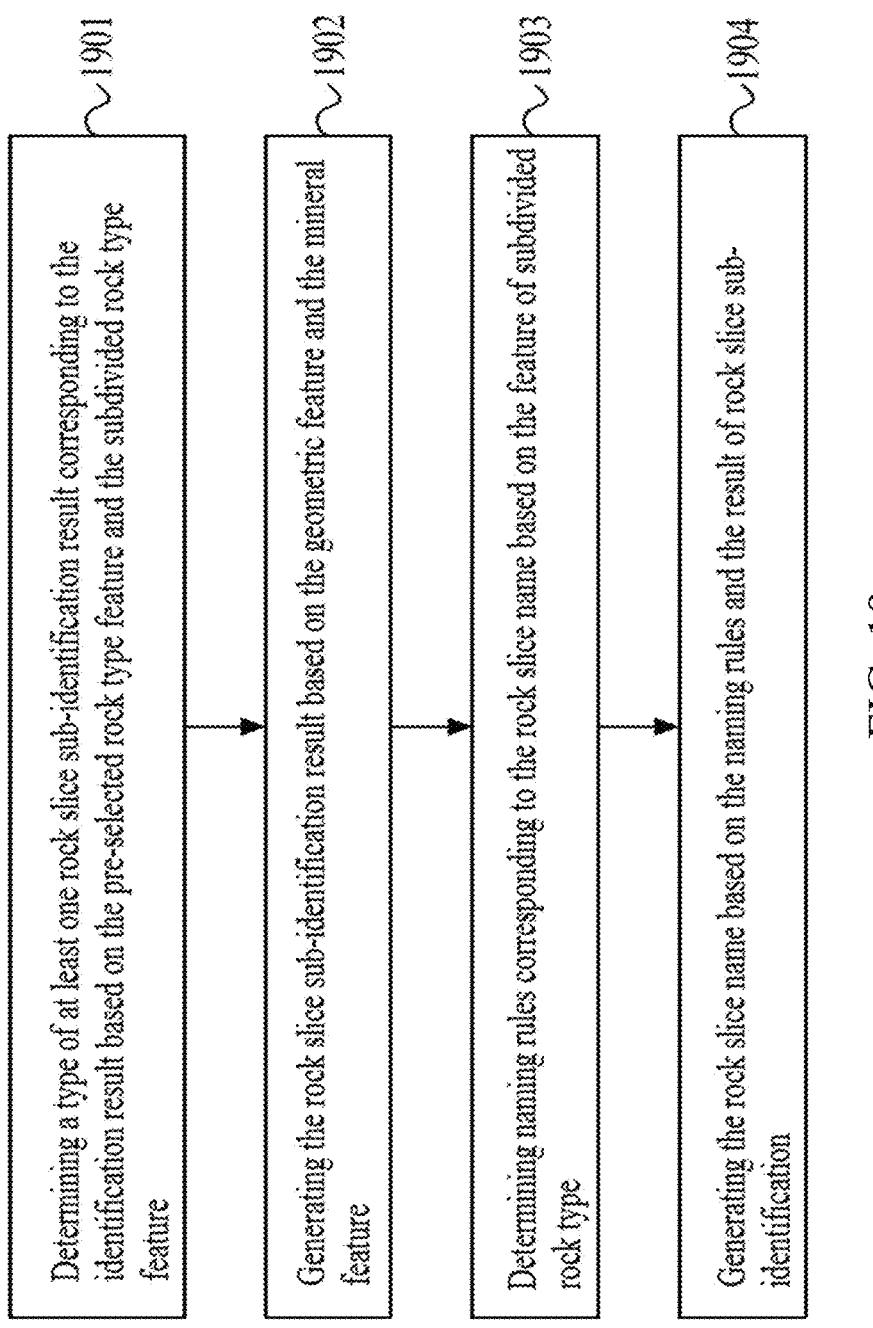
FIG. 19 schematically shows a method for generating an identification result of a rock slice provided by an exemplary embodiment of the present application.

After the determination of the mineral feature and the geometric feature through the methods illustrated in the above embodiments, the identification result corresponding to the rock slice, i.e., a textual description of the feature of the rock sample, is generated in the embodiments of the present application based on the geometric feature, the mineral feature and the structural feature. FIG. 19 schematically shows a method for generating the identification result of a rock slice provided by an exemplary embodiment of the present application, which can be alternatively realized as Step 303 as shown in FIG. 3, The method, when applied to a computer device, is illustrated as follows. The method comprises the following steps.

In Step 1901, a type of at least one rock slice sub-identification result corresponding to the identification result is determined based on the pre-selected rock type feature and the subdivided rock type feature.

In the embodiments of the present application, the rock slice sub-identification result is an identification result that can characterize the specific type of the rock slice, and is obtained based on the shape of the component region and the mineral property of the component region. Optionally, the rock slice identification result includes at least one of a particle size interval identification result, a maximum particle size identification result, a particle sortability result, a particle roundness identification result, a mineral automorphic degree result and a particle contact mode identification result.

In Step 1902, the rock slice sub-identification result is generated based on the geometric feature and the mineral feature.

Optionally, examples corresponding to the methods of determining the above particle size interval identification result, maximum particle size identification result, particle sortability result, particle roundness identification result, mineral automorphic degree result and particle contact mode identification result are provided to illustrate the procedure of generating the rock slice sub-identification result.

In one embodiment, the rock slice identification results include the particle size interval identification result, which indicates the particle size interval of a component region corresponding to one component in the rock slice. First, a set of particle size interval component regions corresponding to the particle size interval identification result is determined based on the mineral feature, wherein the set of particle size interval component regions comprises at least two component regions. Second, a particle size corresponding to the component region in the particle size interval component regions is determined based on the geometrical feature corresponding to the component regions in the set of particle size interval component regions. Finally, the particle size interval identification result is determined based on the particle size corresponding to the component region.

In one embodiment, the rock slice identification result includes a maximum particle size identification result, which indicates a particle size of a component region in the rock slice with the maximum particle size among the component regions corresponding to one component. In this case, the component region with the maximum particle size corresponding to the maximum particle size identification result is determined based on the mineral feature, the maximum particle size corresponding to the component regions is determined based on the geometric feature, and the maximum particle size identification result is generated based on the maximum particle size.

In one embodiment, the rock slice identification result includes the particle sortability result, which indicates a distribution of particle sizes corresponding to one particle type in the rock slice. In this case, a set of sortability component regions corresponding to the particle sortability identification result is first determined based on the mineral feature, the set of sortability component regions including at least two component regions. Second, a particle size grading correspondence is determined based on the geometric feature corresponding to the component regions in the set of sortability component regions, wherein the particle size grading correspondence includes at least two levels of particle size and a number of component regions in the particle size levels. Finally, the particle sortability result is determined based on the particle size grading correspondence.

In one embodiment, the rock slice identification result includes a particle roundness identification result, which indicates roundness of the component regions, and the roundness can be indicated by a roundness level. In this case, a set of roundness identification component regions corresponding to the particle roundness identification result is first determined based on the mineral feature, wherein the set of roundness identification component regions includes at least two component regions. Second, a correspondence of roundness level is determined based on the geometrical feature corresponding to the component regions in the set of roundness component identification regions, wherein the correspondence of roundness level includes at least two roundness levels, and a number of component regions in the roundness levels. Finally, the particle roundness identification result is determined based on the correspondence of roundness level.

In one embodiment, the rock slice identification result includes the mineral automorphic degree result, which indicates a degree to which the minerals in the component region are developed based on their own crystallization habits. In this case, a set of automorphic degree component regions corresponding to the mineral automorphic degree result is first determined based on the mineral feature, wherein the set of automorphic degree component regions includes at least two automorphic degree component regions. Second, the shapes of the component regions are determined based on the geometric feature corresponding to the component regions in the set of automorphic degree component regions. Finally, the mineral automorphic degree result is determined based on the shapes of the component regions.

In one embodiment, the rock slice identification result includes the particle contact mode identification result, which indicates a contact state of two adjacent component regions. In this case, at least two pairs of component regions are determined first based on the mineral feature, one component region pair including two adjacent component regions. Second, an intersection over union of the two component regions in the component region pair is determined based on the geometric feature. Finally, the particle contact mode identification result is determined based on the intersection over union of at least two component regions.

To summarize the above procedure, after determining the type of the rock slice sub-identification result, a component region corresponding to the rock slice sub-identification result in the rock slice image is determined based on the mineral type. Then, based on the geometric features, the rock slice sub-identification result is determined from the shape, form, size, etc., of the component region.

In Step 1903, naming rules corresponding to the rock slice name are determined based on the feature of subdivided rock type.

In the embodiments of the present application, since different rock types correspond to different naming rules, it is necessary to determine the rock slice name based on the feature of subdivided rock type.

In Step 1904, the rock slice name is generated based on the naming rules and the result of rock slice sub-identification.

In this procedure, the rock slice name is finalized. Optionally, the computer device may generate corresponding keywords based on the result of rock slice sub-identification, and finalize the corresponding name of rock slice in combination with the feature of subdivided rock type.

Optionally, for the identification result of the rock slice, a rock sample identification report is also generated in some embodiments of the present application. The rock sample identification report includes the rock slice name and the sub-identification result of each rock slice. In the embodiments of the present application, the computer device prestores at least two rock sample identification reports based on different subdivided rock type features.

In summary, according to the method provided in the embodiments of the present application, the rock slice sub-identification result corresponding to the rock type is selected after obtaining the pre-selected rock type feature and the subdivided rock type feature. Based on the selected rock slice sub-identification result, the final rock slice identification result can correspond to the type of rock slice, so that the accuracy of the rock slice identification result can be further improved.

As described in the above embodiment, the embodiment corresponding to FIG. 19 illustrates the procedure of obtaining the rock slice sub-identification result based on the geometric feature, the mineral feature and the structural feature, and then obtaining the final rock slice identification result.

Figure 20:
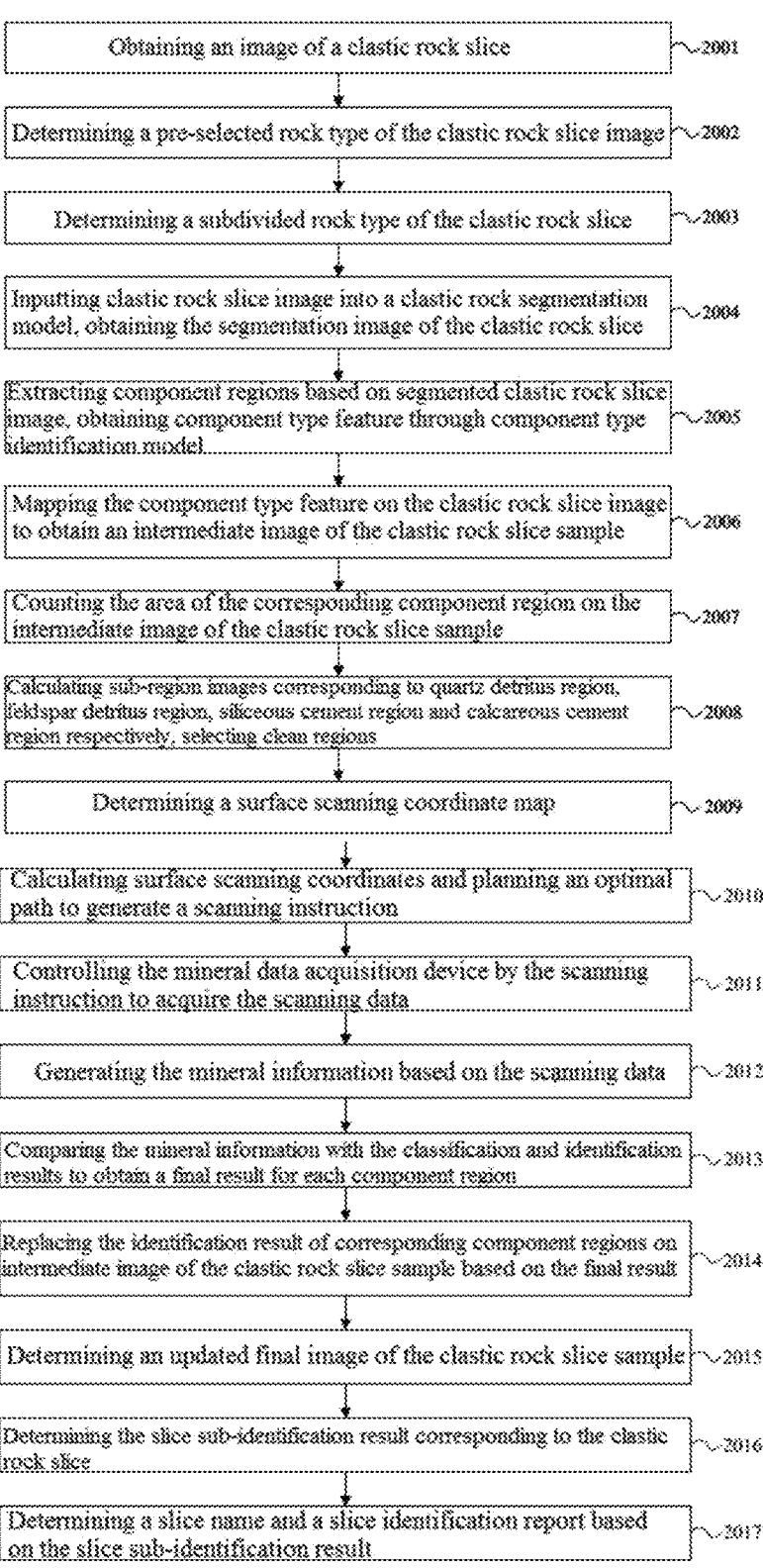
FIG. 20 schematically shows a procedure of a rock identification method provided by an exemplary embodiment of the present application.

In one embodiment, corresponding to the procedure of clastic rock slice identification, FIG. 20 schematically shows a procedure of a rock identification method provided by an exemplary embodiment of the present application. The procedure comprises the following steps.

In Step 2001, an image of a clastic rock slice is obtained.

In the embodiments of the present application, an image of a clastic rock slice sample includes a single polarized image and an orthogonal polarized image. Optionally, the images of the clastic rock slice sample are continuously acquired by an image acquisition device and then combined together, so as to obtain the single polarized image and the orthogonal polarized image corresponding to the clastic rock slice sample.

In Step 2002, a pre-selected rock type of the elastic rock slice image is determined.

In the embodiments of the present application, the pre-selected rock type of the clastic rock slice image is determined as sedimentary rock through a rock classification model.

In Step 2003, a subdivided rock type of the clastic rock slice is determined.

In the embodiments of the present application, the subdivided rock type of the clastic rock slice is determined to be clastic rock with a sandy structure through a rock structure classification model.

In Step 2004, the clastic rock slice image is input into a clastic rock segmentation model, and the segmentation image of the clastic rock slice is obtained.

In this procedure, the clastic rock slice image is segmented through the rock slice segmentation model to obtain the segmentation image. After the segmentation, the computer device can determine the geometric feature of the clastic rock corresponding to the clastic rock slice image.

In Step 2005, component regions are extracted based on the segmented clastic rock slice image, and the component type feature is obtained through the component type identification model.

That is, in this procedure, the mineral feature corresponding to the clastic rock slice image is obtained.

In Step 2006, the component type feature is mapped on the clastic rock slice image to obtain an intermediate image of the clastic rock slice sample.

That is, in this procedure the clastic rock slice image is marked based on the component type feature and the segmentation image, so as to obtain an intermediate image that can characterize the geometric feature and the mineral feature of the clastic rock slice.

In other embodiments of the present application, the component type identification model will directly output the intermediate image of the clastic rock slice sample.

In Step 2007, the area of the corresponding component region is counted on the intermediate image of the clastic rock slice sample.

In the embodiments of the present application, based on the identification result of the mineral types in each component region, the relative content of different components is determined by counting the area of the component region. In one embodiment, based on the mineral types of the components, it can be determined that the siliceous cement accounts for 2.0%, the calcareous cement accounts for 10.5%, the matrix filler accounts for 1%, the rock debris and detritus accounts for 13.84%, the feldspar detritus accounts for 20.76%, and the quartz detritus accounts for 51.9%. Since quartz detritus, feldspar detritus and rock debris and detritus all belong to terrigenous detritus, while siliceous cement, calcareous cement and matrix filler all belong to filler, it can be further determined that the terrigenous detritus accounts for 86.5%, and filler accounts for 13.5%. Then, it can be determined that the clastic rock slice image does not contain non-terrigenous detritus, and that the relative content of particles and fillers is 86.5% of particles and 13.5% of fillers.

In Step 2008, the sub-region images corresponding to the quartz detritus region, the feldspar detritus region, the siliceous cement region and the calcareous cement region are calculated respectively, and clean regions are selected.

Since the quartz detritus region, the feldspar detritus region, the siliceous cement region and the calcareous cement region correspond to monocrystalline components, it is necessary to select clean regions to perform scanning. Optionally, this procedure is realized through a model based on machine learning.

In Step 2009, a surface scanning coordinate map is determined.

That is, in this procedure, the location of specific scanning region is determined. In the embodiments of the present application, the scanning method is surface scanning.

In Step 2010, surface scanning coordinates are calculated and an optimal path is planned to generate a scanning instruction.

Optionally, the computer device determines the scanning instruction in this procedure. Since the regions to be surface-scanned are not adjacent to each other in practice, it is necessary to plan an optimal path.

In Step 2011, the mineral data acquisition device is controlled by the scanning instruction to acquire the scanning data.

That is, in this procedure, the scanning data is transmitted to the mineral data acquisition device, so that the mineral data acquisition device generates the corresponding scanning data. Optionally, the scanning data is spectral data.

In Step 2012, the mineral information is generated based on the scanning data.

That is, in this procedure, the scanning data to be transmitted by the mineral data acquisition device is generated based on the scanning data, and the mineral components of the component region characterized by the scanning data are determined.

In Step 2013, the mineral information is compared with the classification and identification results to obtain a final result for each component region.

That is, in this procedure, the mineral component is compared with the scanning data to obtain a final result.

Optionally, the final verification result is obtained according to the type of the mineral data acquisition device in the procedure.

In Step 2014, the identification result of the corresponding component regions on the intermediate image of the clastic rock slice sample is replaced based on the final result.

That is, in this procedure, the mineral identification result of the component regions on the intermediate image of the clastic rock slice sample obtained by the machine-learning model is replaced based on the verification result of surface scanning. Since the spectral data is more accurate for identification of mineral component, the verification result of surface scanning is used in this step to determine the mineral feature of the component regions.

In Step 2015, an updated final image of the elastic rock slice sample is determined.

Combined with the embodiment in Step 2007, after the updating, the siliceous cement accounts for 2.0%, the calcareous cement, which is calcite in the actual form, accounts for 10.5%, the matrix filler accounts for 1%, the rock debris and detritus accounts for 13.84%, the quartz detritus accounts for 69.2%, and the feldspar detritus accounts for 3.46%. That is, the percentage of terrigenous detritus is still 86.5%, and the percentage of non-terrigenous detritus is still 0%. Correspondingly, the percentage of particles is 86.5%, and the percentage of fillers is 13.5%.

In Step 2016, the slice sub-identification result corresponding to the clastic rock slice is determined.

In the embodiments of the present application, the slice sub-identification result includes a particle size interval identification result, a particle sortability result, a maximum particle size identification result, a relative component content result, a particle roundness identification result, and a particle contact mode identification result. After selection of component regions based on the mineral feature and generation of result based on the geometric feature, it can be determined that, in one embodiment, the main particle size intervals are 10% of fine sand (0.125-0.25 mm), 30% of medium sand (0.25-0.5 mm), and 60% of coarse sand (0.5-2 mm), The maximum particle size is 1.8 mm, and the particle sortability is medium. 85% of the component regions have a particle roundness that is sub-prismatic, 15% of the component regions have a particle roundness that is sub-rounded. 75% of the component regions are in line contact with each other, and 25% of the component regions are in point contact with each other.

In Step 2017, a slice name and a slice identification report are determined based on the slice sub-identification result.

According to FIG. 21, the slice identification report 2100 comprises a clastic rock designation region 2110, which includes a designation for the elastic rock slice based on the slice sub-identification result. In the embodiments of the application, the elastic rock is designated as "medium-coarse grained debris quartz sandstone". Optionally, the designation is based on an industry standard stored in the computer device, i.e., the industry standard CN SY/T 5368-2016 "Rock Slice Identification". The slice identification report 2100 further includes a slice sample information region 2120 indicating the acquisition location and method of the clastic rock sample, a component feature region 2130 indicating the mineral components of the clastic rock sample, a structural feature region 2140 indicating the structural feature of the clastic rock sample, and a rock slice image display region 2150.

In summary, according to the method provided in the embodiments of the present application, after determining that the rock type is elastic rock based on the identification of the structural feature, the final identification result is generated through machine learning-based image segmentation and identification, and verification of the image identification result based on the spectral data acquisition. The chemical feature characterizing component regions in the spectral data is combined with the image feature characterizing component regions in the image to identify the clastic rock slice, so that the efficiency and accuracy of clastic rock slice identification are improved.

As described in the above embodiment, FIG. 20 shows a procedure of determining the geometric feature, the mineral feature and the structural feature of clastic rock, based on which the sub-identification result of the elastic rock slice is determined, and then the final identification result of the clastic rock slice is finally obtained.

Figure 22:
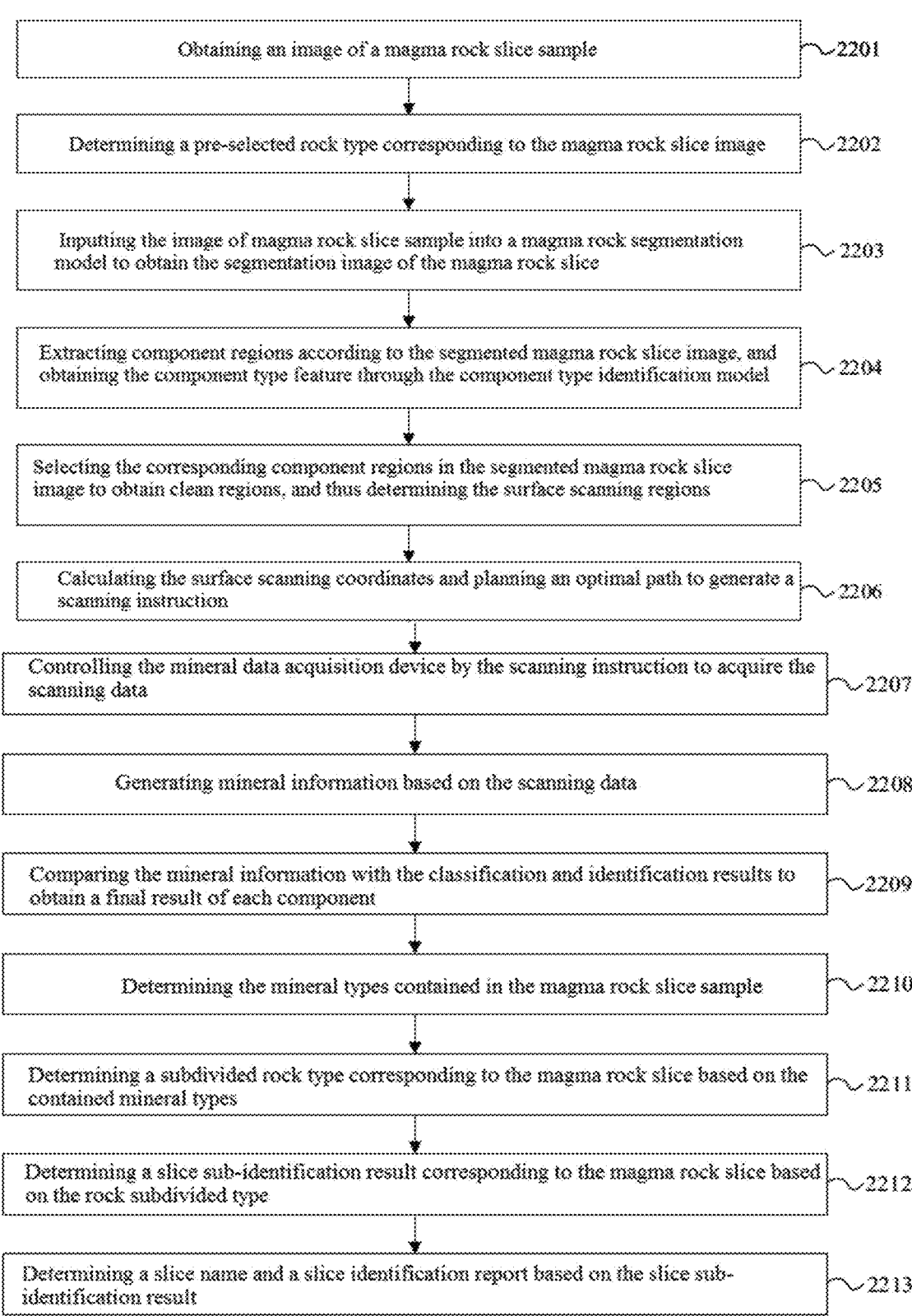
FIG. 22 schematically shows a procedure of a rock identification method provided by an exemplary embodiment of the present application.

In one embodiment, for a magma rock slice identification procedure, FIG. 22 schematically shows a procedure of a rock identification method provided by an exemplary embodiment of the present application. The procedure comprises the following steps.

In Step 2201, an image of a magma rock slice sample is acquired.

Figure 23:
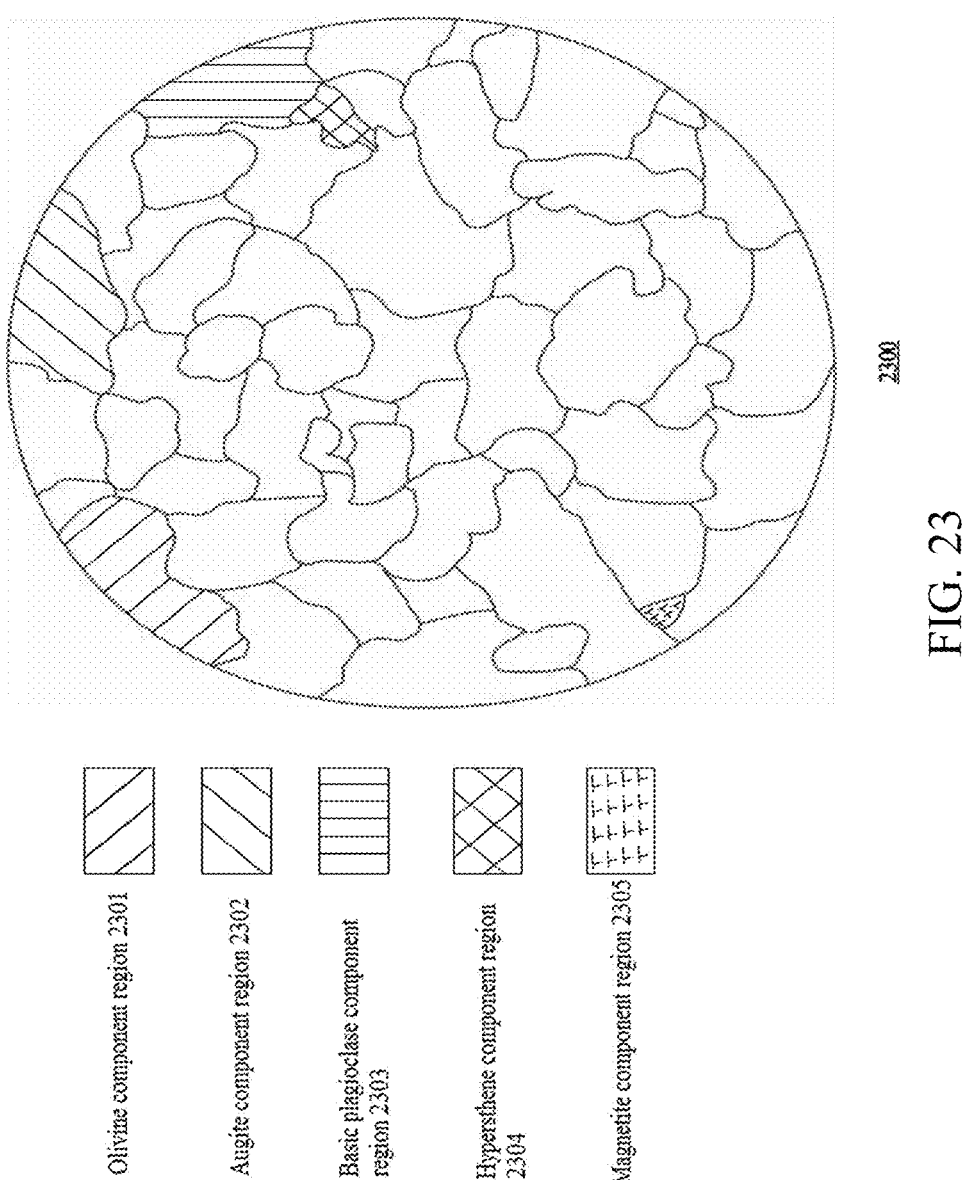

FIG. 23 schematically shows a magma rock slice provided by an exemplary embodiment of the present application. The magma rock slice 2300 includes at least one olivine component region 2301, an augite component region 2302, a basic plagioclase component region 2303, a hypersthene component region 2304 and a magnetite component region 2305.

In the embodiment of the present application, similar to the embodiment shown in FIG. 20, the magma rock slice image also includes a single polarized image and an orthogonal polarized image corresponding to the magma rock slice sample.

In Step 2202, a pre-selected rock type corresponding to the magma rock slice image is determined.

In the embodiment of the present application, the rock is determined to be magma rock based on the magma rock slice image, whereby the geometric feature and the mineral feature thereof are those corresponding to magma rock.

In other embodiments of the present application, a subdivided structure of the magma rock structure can be further determined as gabbro texture through model identification, after determining that the rock slice image is a magma rock slice image. That is, the subdivided rock type may be directly determined after the determination of pre-selected rock type. Accordingly, the geometric feature and the mineral feature thereof are features corresponding to magma rock with gabbro texture.

In Step 2203, the image of magma rock slice sample is input into a magma rock segmentation model to obtain the segmentation image of the magma rock slice.

That is, in this procedure the magma rock slice image is segmented to obtain the segmentation result.

In Step 2204, component regions are extracted according to the segmented magma rock slice image, and the component type feature is obtained through the component type identification model.

That is, in the procedure, the component regions are extracted based on the segmentation result, and the mineral components corresponding to the component regions are further identified.

In Step 2205, the corresponding component regions in the segmented magma rock slice image are selected to obtain clean regions, and thus the surface scanning regions are determined.

In the embodiments of the present application, it is necessary to verify the mineral component corresponding to each component region by acquiring the scanning data. Accordingly, in Step 2205 the surface scanning regions are determined through selecting clean regions.

In Step 2206, the surface scanning coordinates are calculated and an optimal path is planned to generate a scanning instruction.

That is, in this procedure, an optimal path is planned to generate a scanning instruction transmitted to the mineral data acquisition device when the surface scanning regions are not adjacent to each other.

In Step 2207, the mineral data acquisition device is controlled by the scanning instruction to acquire the scanning data.

In this procedure, the computer device controls the mineral data acquisition device to collect the scanning data.

In Step 2208, mineral information is generated based on the scanning data.

That is, in this procedure, the scanning data, i.e., the spectral data, is received from the mineral data acquisition device, and then mineral types corresponding to the component regions are determined based on the spectral data.

In Step 2209, the mineral information is compared with the classification and identification results to obtain a final result of each component.

That is, in this procedure the final mineral type corresponding to each component region is determined through verification.

In Step 2210, the mineral types contained in the magma rock slice are determined.

In the embodiments of the present application, the mineral types contained in the magma rock slice can be determined by determining a mineral type corresponding to each component region. In one embodiment, the magma rock slice contains mineral types such as plagioclase, augite, hypersthene, olivine, biotite, magnetite and apatite.

In Step 2211, a subdivided rock type corresponding to the magma rock slice is determined based on the contained mineral types.

Based on the mineral types obtained in Step 2210, it can be determined that the subdivided rock type corresponding to the magma rock slice is plagioclase. The sub-group is labradorite, which belongs to basic plagioclase.

It should be noted that in the embodiments of the present application, there are at least two subdivided structural features corresponding to the magmatic rock. In one embodiment, in addition to the structural features indicating a specific rock type, the subdivided structural features corresponding to the magma rock further comprise a reaction rim texture feature, which indicates the type of reaction rim contained in the magma rock.

In Step 2212, a slice sub-identification result corresponding to the magma rock slice is determined based on the rock subdivided type.

In one embodiment of the present application, it is determined that based on the rock subdivided type, the slice sub-identification result includes a particle size identification result, a particle size shape result, a mineral automorphic degree result, a particle interaction relationship result and a mineral content result. Based on the mineral feature indicated by the image of magmatic rock slice, plagioclase accounts for 52.4%, augite accounts for 34.9%, hypersthene accounts for 3.2%, olivine accounts for 7.6%, biotite accounts for 1.6%, magnetite accounts for 0.4%, and apatite accounts for 0.1% of the magmatic rock slice.

Based on particles corresponding to olivine and augite, and the interaction between particles corresponding to augite and biotite, the computer device can determine that an outer rim of olivine has a hypersthene edging with a reactive rim texture, which indicates that the magmatic rock is a basic intrusive rock or ultrabasic intrusive rock.

In addition, a particle size analysis of the component region shows that plagioclase has a particle size of (1.6-2.1)×(1.8-3.5) mm, augite has a particle size of 1.2-2.2 mm, hypersthene has a particle size of 1.1-1.7 mm, olivine has a particle size of 0.4-2.5 mm, biotite has a particle size of 1.2-2.2 mm, magnetite has a particle size of 0.05-0.2 mm, and apatite has a particle size of 0.05-0.1 mm. According to statistical data and determination of the correspondence between particle size and shape, the computer device can determine that plagioclase has granular and short plate shapes, augite has irregular granular and short columnar shapes, hypersthenes has a granular shape, olivine has a granular shape, biotite has a slab shape, magnetite has a granular shape, and apatite has a short columnar shape. After an analysis in association with automorphic degree, it can be determined that plagioclase is semi automorphic-heteromorphic, augite is heteromorphic-semiautomorphic, hypersthene is heteromorphic, olivine is heteromorphic, biotite is automorphic-semiautomorphic, magnetite is automorphic, and apatite is semi automorphic-automorphic.

It should be noted that the procedure of determining and generating the sub-identification result of the magmatic rock slice can be regarded as a verification procedure for the structural feature. In the embodiments as described above, by calculating a correlation between olivine and augite, or between augite and biotite, the computer device can determine that the magmatic rock slice has a reaction rim texture, and that the slice sub-identification results corresponding to the magmatic rock slice include a reaction rim texture indicative of a reaction rim. In the preceding steps of determining the subdivided rock type, it has been determined that the rock slice may include a reaction rim texture, so the procedure of determining the reaction rim texture in this step is a verification procedure for the subdivided rock type.

In Step 2213, a slice name and a slice identification report are determined based on the slice sub-identification result.

As described in the above embodiments, in the procedure of determining the slice name and the slice identification report based on the slice sub-identification result, the following elements for naming the magmatic rock can be extracted.

Element 1: in the image of the magmatic rock slice, the component region corresponding to plagioclase indicates that plagioclase has a medium particle size.

Element 2: in the image of the magmatic rock slice, the mineral feature indicates that the major minerals therein include plagioclase and augite.

Element 3: where the major minerals are plagioclase and augite, both plagioclase and augite are determined to have a granular shape based on the geometric feature.

Element 4: where the major minerals are plagioclase and augite, plagioclase and augite are determined to have a similar automorphic degree, i.e., semi automorphic-heteromorphic, based on the geometric feature.

Based on the above elements, it can be determined that the magmatic rock slice may be named as olivine gabbro.

In the embodiments of the present application, after the computer device determines the name of the magma rock slice may be olivine gabbro, it can be verified through a method in the following embodiment. It should be noted that the following verification is carried out under the guidance of relevant national standard data and industry standard data stored in the computer device.

Figure 24:
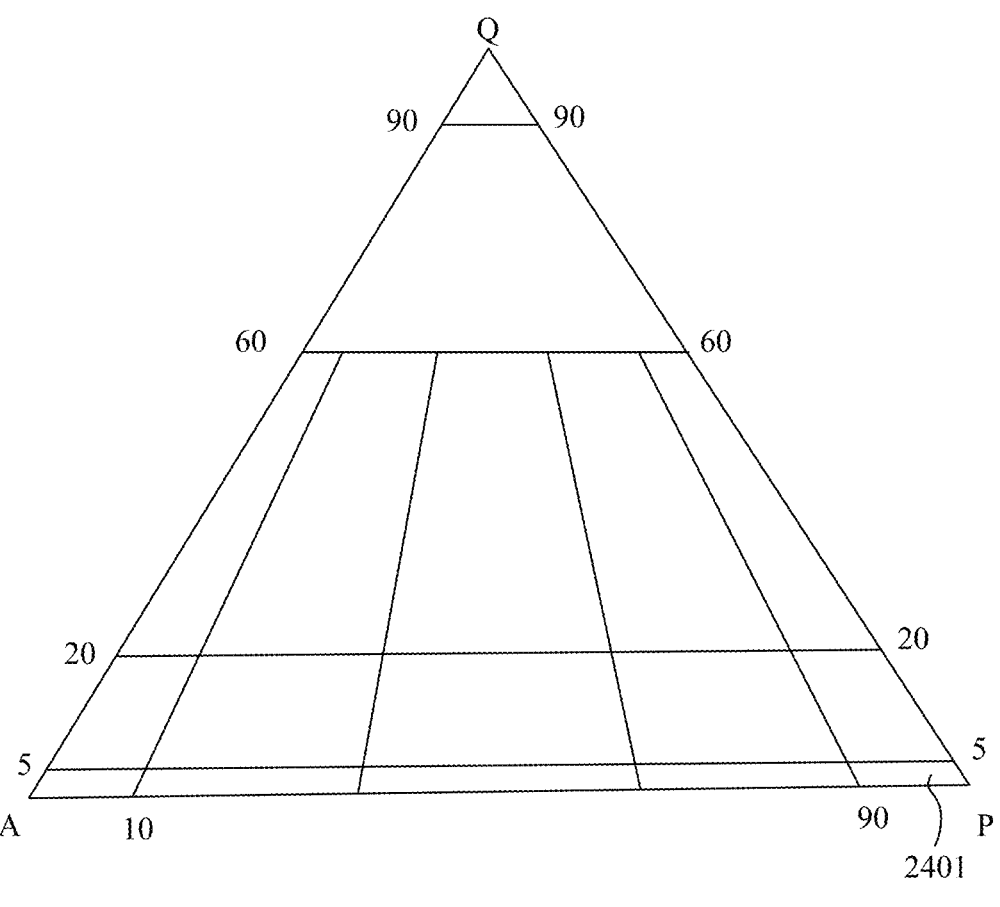
FIG. 24 is a diagram of an intrusive rock classification phase provided by an exemplary embodiment of the present application.

The exemplary method is illustrated as follows. The content is indicated by an area of component region, based on a combination of the mineral feature and the geometric feature. Meanwhile, Q is defined as a sum of content of quartz, tridymite and cristobalite, A is defined as a content of alkali feldspars (i.e., a collection of orthoclase, microcline, perthite, anorthoclase, sanidine and soda feldspar), P is defined as a sum of content of plagioclase and scapolite, F is defined as a sum of content of feldspathoid category and feldspathoid (i.e., a collection of nepheline, leucite, potassium chalcopyrite, pseudoleucite, sodalite, noselite, azurite, calcium chalcopyrite and zeolite), and M is defined as a sum of contents of magnesium-iron minerals and related minerals. In magmatic rocks, minerals in group Q and minerals in group F are mutually exclusive, or, if minerals in group Q are present, minerals in group F must be absent, and vice versa. When the magmatic rock is ultrabasic intrusive or basic intrusive rock, and Q=0, A=0, P=52.4, F=0, and M=47.6, it can be determined that the classification region corresponding to the magmatic rock slice is classification region 2401 in intrusive rock classification phase diagram 2400 according to FIG. 24, on the basis that the relative content of P is 100%. The classification region 2401 indicates that the rock name corresponding to the magmatic rock slice may include at least one of diorite, gabbro and plagioclase. In this case, it is possible to verify that the type of the magma rock slice is gabbro.

Optionally, in other embodiments of the present application, the verification method also includes verifying based on pyroxene structure indicated by the subdivided structural feature, which will not be further illustrated herein.

In this case, since the mineral feature indicates that olivine accounts for 7.6% of the magma rock slice, which is greater than 5%, the olivine feature needs to be reflected in the naming. Correspondingly, it can be verified that the naming of the magma rock slice is finally determined as "olivine gabbro".

It should be noted that the above naming is based on the industry standard and national standard stored in the computer device, i.e., the industry standard CN SY/T 5368-2016 "Rock Slice Identification", and the CN national standard GB/T 17412.1-1998 "Rock Classification and Naming Scheme—Igneous Rock Classification and Naming Scheme". Optionally, the embodiments of the present application further provide a slice identification report corresponding to the magmatic rock slice.

In summary, according to the method provided in the embodiments of the present application, for the case in which the rock slice sample is magma rock, the final identification result is generated through image segmentation and identification based on machine learning, and the verification of the image identification result obtained based on spectral data, after the rock type is determined as magma rock based on the identification of the structural feature. The chemical feature of component regions characterized in the spectral data is combined with the image feature of component regions characterized in the image, so as to determine the subdivided type of the magma rock, and further identify the structural feature and the component feature characterized by the magma rock slice. In this manner, the efficiency and accuracy of the identification of clastic rock slice are both improved.

As described in the above embodiments, FIG. 22 shows an embodiment of a method for magma rock identification, wherein the sub-identification result of magma rock slice is obtained based on the geometric feature, the mineral feature and the structural feature, so that the final identification result can be obtained.

Figure 25:
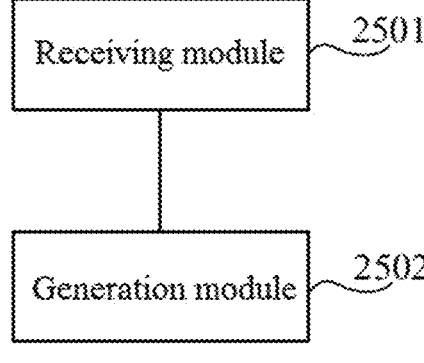
FIG. 25 is a block diagram showing a structure of a rock identification device provided by an exemplary embodiment of the present application.

FIG. 25 is a block diagram showing a structure of a rock identification device provided by an exemplary embodiment of the present application. The device comprises:

a receiving module 2501 for receiving a rock slice image transmitted by an image acquisition device, the rock slice image being an image obtained by photographing the rock slice, the rock slice being a slice obtained by cutting a rock sample, and the rock slice image including at least one component region; and a generation module 2502 for generating the geometric, mineral and structural features corresponding to the rock slice based on the rock slice image; wherein the geometric feature is used to indicate division of component regions in the rock slice, the mineral feature is used to indicate distribution of minerals in the rock slice, and the structural feature is used to indicate spatial structures of the rock sample.

Based on the geometric, mineral and structural features, the identification result of the rock slice is generated, which include a textual description of rock sample features.

In one optional embodiment, the structural feature comprises the pre-selected rock type structural feature for indicating a pre-selected rock type corresponding to the rock sample, which comprises a sedimentary rock type, a magmatic rock type, and a metamorphic rock type.

The generation module 2502 is further used for generating the pre-selected rock type structural feature based on the rock slice image.

Figure 26:
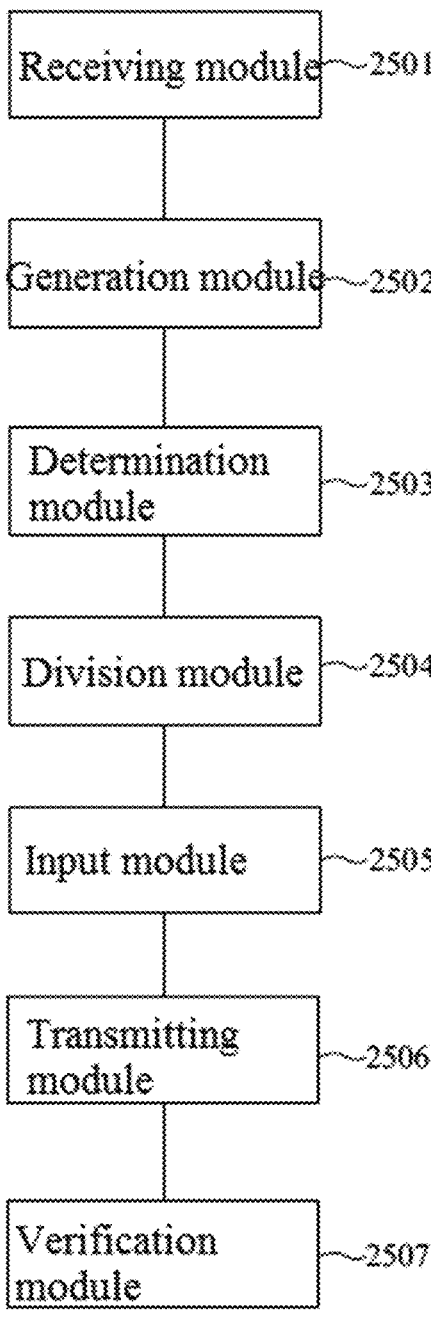
FIG. 26 is a block diagram showing a structure of another rock identification device provided by an exemplary embodiment of the present application.

Referring to FIG. 26, the device further comprises a determination module 250'3 for determining the pre-selected rock type corresponding to the rock slice based on the pre-selected rock type structural feature.

The generation module 2502 is further used for generating the geometric feature based on the rock slice image according to the pre-selected rock type, and generating the mineral feature based on the rock slice image according to the pre-selected rock type.

In one optional embodiment, the structural feature further comprises the subdivided rock type structural feature for indicating a subdivided rock type corresponding to the rock sample.

The determination module 2503 is further used for determining the subdivided rock type structural feature based on the geometric feature and the mineral feature.

In one optional embodiment, the rock slice image includes at least two component images characterizing the component regions, and the device further comprises a division module 2504 for dividing the rock slice image based on positions of the component images, so as to obtain a rock slice segmentation image comprising at least two segmentation regions for indicating segmentation of the rock slice image based on component regions.

The determination module 2503 is further used for determining the geometric feature corresponding to the rock slice based on the segmentation regions, and determining the mineral feature corresponding to the rock slice based on the segmentation regions.

In one optional embodiment, the device further comprises an input module 2505 for inputting the rock slice image into a rock slice image segmentation model, which outputs a rock slice segmentation image, wherein the rock slice image segmentation model is a Mask-RCNN network model based on machine learning.

In one optional embodiment, the determination module 2503 is further used to determine each component image based on each segmentation region, each component image comprising one component region.

The input module 2505 is further used to input the component images into the component type identification model, which outputs the component type feature of the component images for characterizing the mineral feature of the component regions, wherein the component type identification model is a neural network model based on machine learning.

The determination module 2503 is further used to determine the mineral feature corresponding to the rock slice based on the component type feature corresponding to the component images.

In one optional embodiment, the rock identification system further includes a mineral data acquisition device connected to a computer device.

The input module 2505 is further used to input the rock slice segmentation image into a classification and identification model, which outputs a monocrystalline component collection image and a non-monocrystalline component collection image, the monocrystalline component collection image including at least one monocrystalline component region and a monocrystalline component identification result corresponding thereto, and the non-monocrystalline component region including at least one non-monocrystalline component region and a non-monocrystalline component identification result corresponding thereto, the classification and identification model being a neural network model based on deep learning.

The device further comprises a transmitting module 2506 for sending a scanning instruction to the mineral data acquisition device based on the monocrystalline component collection image. The receiving module 2501 is further used for receiving the scanning data fed back by the mineral data acquisition device based on the scanning instruction.

The device further comprises a verification module 2507 for verifying the monocrystalline component identification result based on the scanning data to obtain the verification result. The determination module 2503 is further used for determining the mineral feature corresponding to the rock slice based on the non-monocrystalline component identification result, the monocrystalline component identification result and the verification result.

In one optional embodiment, the input module 2505 is further used to input the monocrystalline component collection image into a region selecting model, which outputs a region selecting result for indicating a portion of the monocrystalline component collection image used for generating the surface scanning data. The generating module 2502 is further used for generating the scanning instruction based on the region selecting result, and the transmitting module 2506 is further used for transmitting the scanning instruction to the mineral data acquisition device.

In one optional embodiment, the determination module 2503 is further used to determine a scanning identification result based on scanning data.

Responsive to the scanning identification result which is the same as the monocrystalline component identification result, it is determined that the verification result indicates that the verification is passed, and that the monocrystalline component identification result is unchanged.

Responsive to the surface scanning identification result which is different from the monocrystalline component identification result, it is determined that the verification result indicates that the verification fails, and the monocrystalline component identification result is determined based on identification result generation rules including rules based on types of mineral data acquisition device.

In one optional embodiment, the determination module 2503 is further used to determine each component image based on each segmentation region, each component image comprising one component region. The transmitting module 2506 is further used for transmitting a spectral data acquisition instruction to the mineral data acquisition device based on the component images. The receiving module 2501 is further used for receiving the spectral data transmitted by the mineral data acquisition device based on the spectral data acquisition instruction. The determination module 2503 is further used for: determining, based on the spectral data, the pre-selected mineral type corresponding to the component region in the mineral spectral data database; determining the mineral type verification rules corresponding to the pre-selected mineral type; determining the mineral type corresponding to the component region based on the mineral type verification rules and the pre-selected mineral type; and determining the mineral feature corresponding to the rock slice based on the mineral type corresponding to the component images.

In one optional embodiment, the mineral spectral data database includes mineral type sub-databases. The determination module 2503 is further used to: determine, based on the spectral data, a first-level category of the pre-selected mineral type corresponding to the component region in the mineral spectral data database, wherein the first-level category of the mineral type, as defined based on how common the minerals are, comprises common mineral category and uncommon mineral category, the pre-selected mineral types corresponding to the common mineral category including mineral group types and common mineral types, and the pre-selected mineral types corresponding to the uncommon mineral category including inclusions mineral types, highly sensitive mineral types and alteration mineral types; and determining the pre-selected mineral type corresponding to the component region based on the mineral type sub-database corresponding to the first-level category of mineral type.

In one optional embodiment, the mineral type verification rules include a classification and verification rule, a direct verification rule and a selected point re-verification rule. The determination module 2503 is further used to determine that: the mineral type verification rule is a classification and verification rule, responsive to the pre-selected mineral type being a mineral group type; the mineral type verification rule is a selected point re-verification rule, responsive to the pre-selected mineral type being inclusions mineral type, highly sensitive mineral type or alteration mineral type; the mineral type verification rule is a direct verification rule, responsive to the pre-selected mineral type being a common mineral type, or, the first-level category corresponding to the pre-selected mineral type being an uncommon mineral category, and the pre-selected mineral type not being any one of inclusions mineral type, highly sensitive mineral type and alteration mineral type.

In one optional embodiment, the rock slice image includes at least two component images characterizing the component regions. The input module 2505 is further used to input the rock slice image into the rock slice image segmentation and identification model, which outputs at least two segmentation regions corresponding to the rock slice image, and the component type feature corresponding to the segmentation regions, wherein the segmentation regions are used to indicate segmentation of the rock slice image based on the component regions, the component type features are used to characterize the mineral feature of the component regions in the segmentation regions, and the rock slice image segmentation and identification model is a neural network model based on machine learning. The determination module 2503 is further used to determine the geometric feature and the mineral feature corresponding to the rock slice in combination with the segmentation regions and the component type feature.

In one optional embodiment, the input module 2505 is further used to input the rock slice image into the pre-selected rock type selection model, which outputs the pre-selected rock type result indicating the structural feature of the pre-selected rock type corresponding to the rock slice. The pre-selected rock type selection model is a model constructed based on the set of sample images of the pre-selected rock type.

In one optional embodiment, the identification result includes the subdivided rock type. The input module 2505 is further used to input the geometric feature and the mineral feature into the subdivided rock type selection model, which outputs a subdivided rock type result indicating the subdivided rock structural feature corresponding to the rock slice. The subdivided rock type selection model is a model constructed based on a set of geometric and mineral feature interaction samples indicating a correspondence between a combination of the geometric and mineral features and the structural feature of the subdivided rock type.

In one optional embodiment, the identification result includes at least one of the rock slice sub-identification result and the rock slice name. The determination module 2503 is further used to determine, based on the pre-selected rock type feature and the subdivided rock type feature, a type of at least one rock slice sub-identification result corresponding to the identification result. The rock slice identification result includes at least one of the particle size interval identification result, the maximum particle size identification result, the particle sortability result, the particle roundness identification result, the mineral automorphic degree result, and the particle contact mode identification result. The generating module 2502 is further used for generating the rock slice sub-identification result based on the geometric feature and the mineral feature, and the determination module 2503 is further used for determining a rock slice name based on the rock slice identification result.

In summary, the device provided by the embodiments of the present application, after obtaining a rock slice image, carries out feature extraction based on the geometric feature, the mineral feature, and the structural feature of the rock slice image in three dimensions, determines the properties of the rock from the perspectives of microscopic composition and macroscopic performance by integrating multiple dimensional features, and ultimately generates an identification result that includes a textual description. In the procedure of rock identification, after a microscopic visualized image corresponding to the rock slice is obtained, the image is subject to multi-dimensional feature extraction. Then the rock slice is identified with reference to the multi-dimensional features, which improves the accuracy of rock identification.

It should be noted that the rock identification device provided by the above embodiments is only illustrated by the above functional modules individually as examples. In practice, the above functions may be assigned to be completed by different functional modules according to needs, i.e., the internal structure of the device may be divided into different functional modules in order to complete all or part of the above functions.

Figure 27:
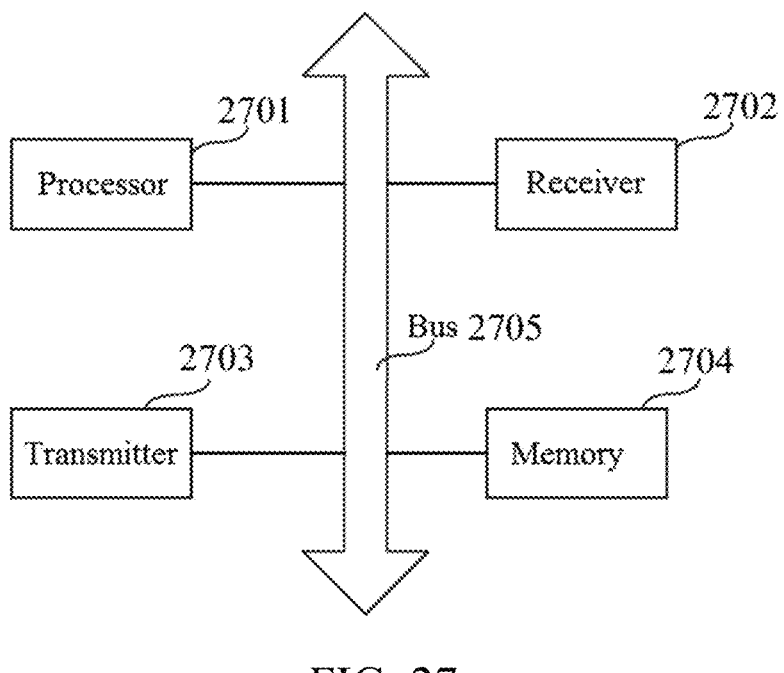
FIG. 27 schematically shows a structure of a computer device for performing a rock identification method provided by an exemplary embodiment of the present application.

FIG. 27 schematically shows a structure of a computer device for performing a rock identification method provided by an exemplary embodiment of the present application. The computer device comprises the following components.

A processor 2701 includes one or more processing cores, and performs various functional applications and data processing by running software programs and modules.

A receiver 2702 and a transmitter 2703 may be realized as one communication component, which may be a communication chip. Optionally, the communication component may have functions including signal transmission. That is, the transmitter 2703 may be used to transmit control signals to the image acquisition device and the scanning device, and the receiver 2702 may be used to receive corresponding feedback instructions.

A memory 2704 is connected to the processor 2701 via a bus 2705.

The memory 2704 may be used to store at least one instruction, and the processor 2701 may be used to execute the at least one instruction to realize each step in the above method embodiments.

The embodiments of the present application also provide a computer-readable storage medium with at least one instruction, at least one segment of program, one code set or one instruction set stored therein to be loaded and executed by the processor, so as to implement the above rock identification method.

The present application also provides a computer program product or computer program comprising a computer instruction stored in the computer-readable storage medium. A processor of the computer device reads the computer instruction from the computer-readable storage medium and executes the computer instruction so that the computer device performs any one of the rock identification methods described in above embodiments.

Optionally, the computer-readable storage medium may include: a read only memory (ROM), a random access memory (RAM), a solid state drives (SSD), or a CD, and the like. Among them, the random access memory may include a resistance random access memory (ReRAM) and a dynamic random access memory (DRAM). The serial numbers of the above embodiments of the present application are for illustrative purposes only and do not represent the advantages or disadvantages of the embodiments.

One skilled in the art may understand that all or part of the steps for realizing the above embodiments may be completed by hardware, or by a program which instructs the relevant hardware.

The program may be stored in a computer-readable storage medium which may be a read only memory, a disk or a CD, etc.

The foregoing description is merely illustrative of optional embodiments of the present invention, and is not intended to limit the present invention. Any modifications, equivalent substitutions, improvements, and the like within the spirit and principles of the present invention are intended to be included within the scope of protection of the present invention.

The invention claimed is:

1. A rock identification method, comprising:
   receiving a rock slice image obtained by photographing a rock slice obtained by cutting a rock sample, the rock slice image including at least one component region;

generating a geometric feature, a mineral feature and a structural feature corresponding to the rock slice based on the rock slice image, wherein the geometric feature is used to indicate division of the component region of the rock slice, the mineral feature is used to indicate distribution of mineral type corresponding to the component region in the rock slice and a mineral identification result obtained therefrom, and the structural feature is used to indicate rock type of the rock sample; and generating an identification result of the rock slice based on the geometric feature, the mineral feature and the structural feature, wherein the structural feature comprises a structural feature of pre-selected rock type and a structural feature of subdivided rock type, wherein the step of generating the geometric feature, the mineral feature and the structural feature corresponding to the rock slice based on the rock slice image comprises:

generating the structural feature of pre-selected rock type based on the rock slice image, wherein the structural feature of pre-selected rock type is used to indicate a pre-selected rock type corresponding to the rock sample, the pre-selected rock type comprising sedimentary rock, magmatic rock, and metamorphic rock;

determining the pre-selected rock type corresponding to the rock slice based on the structural feature of pre-selected rock type;

generating the geometric feature based on the rock slice image according to the pre-selected rock type; and generating the mineral feature based on the rock slice image according to the pre-selected rock type, and determining the structural feature of subdivided rock type based on the geometric feature and the mineral feature, for indicating a subdivided rock type corresponding to the rock sample.

2. The method according to claim 1, wherein the rock slice image comprises at least two component images characterizing the component region, wherein the step of generating the geometric feature, the mineral feature and the structural feature corresponding to the rock slice based on the rock slice image comprises:

dividing the rock slice image based on positions of the component images to obtain a rock slice segmentation image comprising at least two segmentation regions, which indicates segmentation of the rock slice image based on the component region;

determining the geometric feature corresponding to the rock slice based on the segmentation regions; and determining the mineral feature corresponding to the rock slice based on the segmentation regions.

3. The method according to claim 2, wherein the step of dividing the rock slice image based on the positions of the component images to obtain the rock slice segmentation image comprises:

inputting the rock slice image into a rock slice image segmentation model to output the rock slice segmentation image, wherein the rock slice image segmentation model is a Mask-RCNN network model based on machine learning.

4. The method according to claim 2, wherein the step of determining the mineral feature corresponding to the rock slice based on the segmentation regions comprises:

determining each component image based on each segmentation region, each component image comprising one component region;

inputting the component image into a component type identification model to output a component type feature of the component image for characterizing the mineral feature of the component region, wherein the component type identification model is a neural network model based on machine learning; and determining the mineral feature corresponding to the rock slice based on the component type feature of the component image.

5. The method according to claim 2, wherein the step of determining the mineral feature corresponding to the rock slice based on the segmentation regions comprises:

inputting the rock slice segmentation image into a classification and identification model to output a monocrystalline component collection image and a non-monocrystalline component collection image, wherein the monocrystalline component collection image includes at least one monocrystalline component region and a monocrystalline component identification result corresponding thereto, and the non-monocrystalline component region includes at least one non-monocrystalline component region and a non-monocrystalline component identification result corresponding thereto, the classification and identification model being a neural network model based on deep learning;

transmitting a scanning instruction to a mineral data acquisition device based on the monocrystalline component collection image;

receiving scanning data from the mineral data acquisition device based on the scanning instruction;

verifying the monocrystalline component identification result based on the scanning data to obtain a verification result; and determining the mineral feature corresponding to the rock slice based on the non-monocrystalline component identification result, the monocrystalline component identification result and the verification result.

6. The method according to claim 5, wherein the step of transmitting a scanning instruction to the mineral data acquisition device based on the monocrystalline component collection image comprises:

inputting the monocrystalline component collection image into a region selecting model to output a region selecting result, which is used to indicate a portion of the monocrystalline component collection image for surface scanning data;

generating the scanning instruction based on the region selecting result; and transmitting the scanning instruction to the mineral data acquisition device.

7. The method according to claim 5, wherein the step of verifying the monocrystalline component identification result based on the scanning data to obtain the verification result comprises:

determining a scanning identification result based on the scanning data;

determining, in response to the scanning identification result which is the same as the monocrystalline component identification result, that the verification result indicates that the verification is passed, and that the monocrystalline component identification result is unchanged; and determining, in response to the surface scanning identification result which is different from the monocrystalline component identification result, that the verification result indicates that the verification fails, and determining the monocrystalline component identification result based on an identification result generation rule including a rule based on a type of the mineral data acquisition device.

8. The method according to claim 5, wherein the step of determining the mineral feature corresponding to the rock slice based on the segmentation region comprises:

determining each component image based on each segmentation region, each component image including one component region;

transmitting a spectral data acquisition instruction to the mineral data acquisition device based on the component image;

receiving the spectral data transmitted by the mineral data acquisition device based on the spectral data acquisition instruction;

determining, based on the spectral data, a pre-selected mineral type corresponding to the component region in a mineral spectral data database;

determining a mineral type verification rule corresponding to the pre-selected mineral type;

determining a mineral type corresponding to the component region based on the mineral type verification rule and the pre-selected mineral type; and determining the mineral feature corresponding to the rock slice based on the mineral type corresponding to the component image that is a part of the rock slice segmentation image.

9. The method according to claim 8, wherein the mineral spectral data database comprises a mineral type sub-database, wherein the step of determining, based on the spectral data, a pre-selected mineral type corresponding to the component region in the mineral spectral data database comprises:

determining, based on the spectral data, a first level category of the pre-selected mineral type corresponding to the component region in the mineral spectral data database, wherein the first level category of mineral type is a category defined based on how common the mineral is, and comprises a common mineral category and an uncommon mineral category, the pre-selected mineral type corresponding to the common mineral category comprising a mineral group type and a common mineral type, and the pre-selected mineral type corresponding to the uncommon mineral category comprising an inclusion mineral type, a highly sensitive mineral type and an alteration mineral type; and determining, based on the mineral type sub-database corresponding to the first level category of the mineral type, the pre-selected mineral type corresponding to the component region.

10. The method according to claim 9, wherein the mineral type verification rule includes a classification and verification rule, a direct verification rule, and a selected point re-verification rule, wherein the step of determining the mineral type verification rule corresponding to the pre-selected mineral type comprises:

determining the mineral type verification rule to be the classification and verification rule, in response to the pre-selected mineral type as a mineral group type;

determining the mineral type verification rule to be the selected point re-verification rule, in response to the pre-selected mineral type as the inclusion mineral type, the highly sensitive mineral type or the alteration mineral type; and determining the mineral type verification rule to be the direct verification rule, in response to the pre-selected mineral type as the common mineral type, or in response to the first level category corresponding to the pre-selected mineral type as the uncommon mineral type and the pre-selected mineral type being not any one of the inclusions mineral type, the highly sensitive mineral type and the alteration mineral type.

11. The method according to claim 2, wherein the rock slice image comprises at least two component images characterizing the component region, wherein the step of generating the geometric feature, the mineral feature and the structural feature corresponding to the rock slice based on the rock slice image comprises:

inputting the rock slice image into a rock slice image segmentation and identification model to output at least two segmentation regions corresponding to the rock slice image, and the component type feature corresponding thereto, wherein the segmentation regions indicate the segmentation of the rock slice image based on the component regions, and the component type feature is used to characterize the mineral feature of the component regions in the segmentation regions, the rock slice image identification model being a neural network model based on machine learning; and determining the geometric feature and the mineral feature corresponding to the rock slice in combination with the segmentation regions and the component type feature.

12. The method according to claim 1, wherein the identification result comprises a pre-selected rock type, wherein the step of determining the pre-selected rock type corresponding to the rock slice based on the structural feature of the pre-selected rock type comprises:

inputting the rock slice image into a pre-selected rock type selection model to output a pre-selected rock type result, which indicates the structural feature of the pre-selected rock type corresponding to the rock slice, the pre-selected rock type structure selection model being a model constructed based on a sample set of pre-selected rock type images.

13. The method according to claim 12, wherein the identification result further comprises a subdivided rock type, wherein the step of determining the structural feature of the subdivided rock type based on the geometric feature and the mineral feature comprises:

inputting the geometric feature and the mineral feature into a subdivided rock type selection model to output a subdivided rock type result, which indicates the structural feature of the subdivided rock type corresponding to the rock slice, wherein the subdivided rock type selection model is a model constructed based on a geometric-mineral feature interaction sample set, which indicates a correspondence between a combination of the geometric feature and the mineral feature, and the structural feature of the subdivided rock type.

14. The method according to claim 13, wherein the identification result further comprises at least one of a rock slice sub-identification result and a rock slice name, wherein the step of generating the identification result of the rock slice based on the geometric feature, the mineral feature and the structural feature comprises:

determining, based on the pre-selected rock type feature and the structural feature of the subdivided rock type, at least one type of a rock slice sub-identification result corresponding to the identification result, wherein the rock slice sub-identification result includes at least one of a particle size interval identification result, a maximum particle size identification result, a particle sortability result, a particle roundness identification result, a mineral automorphic degree result, and a particle contact mode identification result;

generating the rock slice sub-identification result based on the geometric feature and the mineral feature; and determining the rock slice name based on the rock slice sub-identification result.

* * * * *